(12) United States Patent
Matsuyama et al.

(10) Patent No.: US 11,036,549 B2
(45) Date of Patent: Jun. 15, 2021

(54) PARALLEL PROCESSING APPARATUS, AND METHOD OF MAINTAINING PARALLEL PROCESSING APPARATUS

(71) Applicant: FUJITSU LIMITED, Kawasaki (JP)

(72) Inventors: Kazuhiro Matsuyama, Mishima (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 245 days.

(21) Appl. No.: 16/009,274

(22) Filed: Jun. 15, 2018

(65) Prior Publication Data
US 2019/0004857 A1 Jan. 3, 2019

(30) Foreign Application Priority Data
Jun. 29, 2017 (JP) .............................. JP2017-128051

(51) Int. Cl.
*G06F 9/46* (2006.01)
*G06F 9/48* (2006.01)
*G06F 9/52* (2006.01)

(52) U.S. Cl.
CPC .......... *G06F 9/4887* (2013.01); *G06F 9/4881* (2013.01); *G06F 9/52* (2013.01)

(58) Field of Classification Search
CPC ......... G06F 9/4887; G06F 9/4881; G06F 9/52
See application file for complete search history.

(56) References Cited

U.S. PATENT DOCUMENTS

| | | | | |
|---|---|---|---|---|
| 2012/0072758 A1* | 3/2012 | Shafi | .................... | G06F 9/5011 713/400 |
| 2015/0026326 A1* | 1/2015 | Narita | ................ | G06Q 10/0631 709/223 |
| 2015/0220370 A1* | 8/2015 | Ujibashi | ............... | G06F 9/5088 718/104 |
| 2016/0366020 A1* | 12/2016 | Ramachandran | .. | G06Q 10/0631 |

FOREIGN PATENT DOCUMENTS

| | | |
|---|---|---|
| JP | 08-016410 | 1/1996 |
| JP | 2001-184326 | 7/2001 |

OTHER PUBLICATIONS

Etsion et al., "A Short Survey of Commercial Cluster Batch Schedulers", School of Computer Science and Engineering, The Hebrew University of Jerusalem 44221 (2005), (4 pages).

* cited by examiner

*Primary Examiner* — Tammy E Lee
(74) *Attorney, Agent, or Firm* — Fujitsu Patent Center

(57) ABSTRACT

A parallel processing apparatus includes: a memory; and a processor coupled to the memory, the processor is configured to: acquire a first time and a second time; divide a plurality of nodes into a plurality of groups; generate a plurality of schedule candidates each which assigns time zones corresponding to a length of time used to perform a maintenance operation at one or more nodes included in the plurality of groups in a time period from the first time to the second time to the plurality of groups such that no overlap occurs among the plurality of groups; evaluate the plurality of schedule candidates based on one or more process execu- (Continued)

tion schedules of the one or more nodes in the time period; and output one schedule candidate of the plurality of schedule candidates based on a result of the evaluation.

10 Claims, 25 Drawing Sheets

FIG. 7

| ID | MAXIMUM X-COORDINATE VALUE (Xmax) | MINIMUM X-COORDINATE VALUE (Xmin) | SCHEDULED JOB START TIME (Jstart) | SCHEDULED JOB END TIME (Jend) |
|---|---|---|---|---|
| J(1) | 1 | 6 | 01 | 06 |
| J(2) | 9 | 12 | 01 | 03 |
| J(3) | 7 | 9 | 03 | 07 |
| J(4) | 1 | 6 | 06 | 10 |
| J(5) | 8 | 11 | 07 | 11 |

| NUMBER OF COMPUTERS (Hnum) | LENGTH IN X-COORDINATE (Hlen(X)) |
|---|---|
| 6 | 6 |

FIG. 10

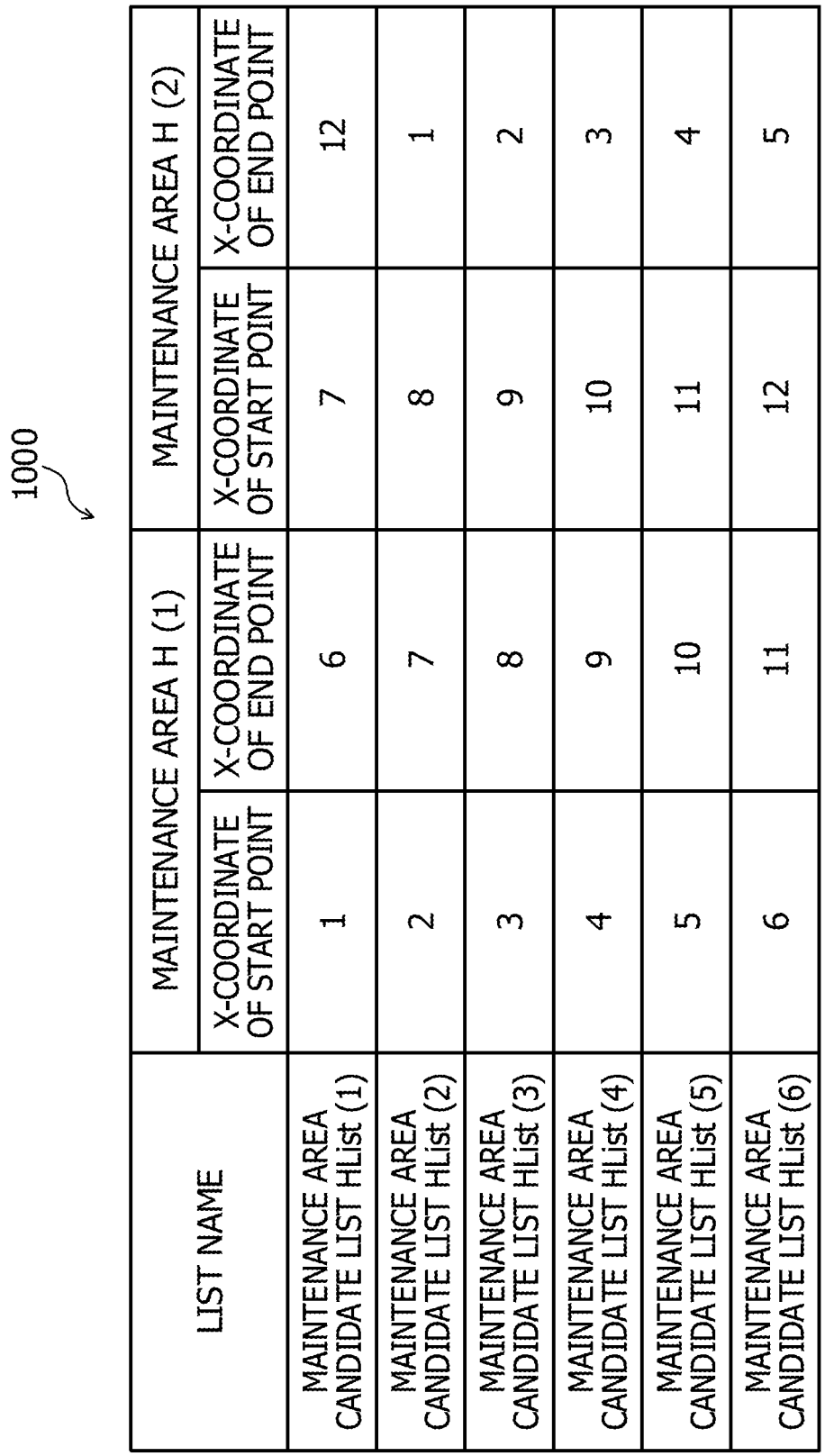

| LIST NAME | MAINTENANCE AREA H (1) | | MAINTENANCE AREA H (2) | |
|---|---|---|---|---|
| | X-COORDINATE OF START POINT | X-COORDINATE OF END POINT | X-COORDINATE OF START POINT | X-COORDINATE OF END POINT |
| MAINTENANCE AREA CANDIDATE LIST HList (1) | 1 | 6 | 7 | 12 |
| MAINTENANCE AREA CANDIDATE LIST HList (2) | 2 | 7 | 8 | 1 |
| MAINTENANCE AREA CANDIDATE LIST HList (3) | 3 | 8 | 9 | 2 |
| MAINTENANCE AREA CANDIDATE LIST HList (4) | 4 | 9 | 10 | 3 |
| MAINTENANCE AREA CANDIDATE LIST HList (5) | 5 | 10 | 11 | 4 |
| MAINTENANCE AREA CANDIDATE LIST HList (6) | 6 | 11 | 12 | 5 |

FIG. 14

| MAINTENANCE AREA ID | MINIMUM X-COORDINATE VALUE | MAXIMUM X-COORDINATE VALUE | MAINTENANCE START TIME | MAINTENANCE END TIME |
|---|---|---|---|---|
| H(1) | 1 | 6 | 06 | 07 |
| H(2) | 7 | 12 | 07 | 08 |

| NUMBER OF COMPUTERS (Hnum) | LENGTH IN X-COORDINATE (Hlen(X)) |
|---|---|
| 5 | 5 |

| LIST NAME | MAINTENANCE AREA H (1) | | MAINTENANCE AREA H (2) | | MAINTENANCE AREA H (3) | |
|---|---|---|---|---|---|---|
| | X-COORDINATE OF START POINT | X-COORDINATE OF END POINT | X-COORDINATE OF START POINT | X-COORDINATE OF END POINT | X-COORDINATE OF START POINT | X-COORDINATE OF END POINT |
| MAINTENANCE AREA CANDIDATE LIST HList (1) | 1 | 5 | 6 | 10 | 11 | 12 |
| MAINTENANCE AREA CANDIDATE LIST HList (2) | 2 | 6 | 7 | 11 | 12 | 1 |
| MAINTENANCE AREA CANDIDATE LIST HList (3) | 3 | 7 | 8 | 12 | 1 | 2 |
| MAINTENANCE AREA CANDIDATE LIST HList (4) | 4 | 8 | 9 | 1 | 2 | 3 |
| MAINTENANCE AREA CANDIDATE LIST HList (5) | 5 | 9 | 10 | 2 | 3 | 4 |
| MAINTENANCE AREA CANDIDATE LIST HList (6) | 6 | 10 | 11 | 3 | 4 | 5 |
| MAINTENANCE AREA CANDIDATE LIST HList (7) | 7 | 11 | 12 | 4 | 5 | 6 |
| MAINTENANCE AREA CANDIDATE LIST HList (8) | 8 | 12 | 1 | 5 | 6 | 7 |
| MAINTENANCE AREA CANDIDATE LIST HList (9) | 9 | 1 | 2 | 6 | 7 | 8 |
| MAINTENANCE AREA CANDIDATE LIST HList (10) | 10 | 2 | 3 | 7 | 8 | 9 |
| MAINTENANCE AREA CANDIDATE LIST HList (11) | 11 | 3 | 4 | 8 | 9 | 10 |
| MAINTENANCE AREA CANDIDATE LIST HList (12) | 12 | 4 | 5 | 9 | 10 | 11 |

FIG. 21

| LIST NAME | JOB OVERLAPPING WITH MAINTENANCE IN MAINTENANCE AREA H (1) | JOB OVERLAPPING WITH MAINTENANCE IN MAINTENANCE AREA H (2) | JOB OVERLAPPING WITH MAINTENANCE IN MAINTENANCE AREA H (3) | NUMBER OF OVERLAPPING JOBS |
|---|---|---|---|---|
| MAINTENANCE AREA CANDIDATE LIST HList (1) | J1,J4 | J1,J4,J3,J5 | J5 | 7 |
| MAINTENANCE AREA CANDIDATE LIST HList (2) | J1,J4 | J3,J5 | J1,J4 | 6 |
| MAINTENANCE AREA CANDIDATE LIST HList (3) | J1,J3,J4 | J3,J5 | J1,J4 | 7 |
| MAINTENANCE AREA CANDIDATE LIST HList (4) | J1,J3,J4,J5 | J1,J3,J4,J5 | J1,J4 | 10 |
| MAINTENANCE AREA CANDIDATE LIST HList (5) | J1,J3,J4,J5 | J1,J4,J5 | J1,J4 | 9 |
| MAINTENANCE AREA CANDIDATE LIST HList (6) | J1,J3,J4,J5 | J1,J4,J5 | J1,J4 | 9 |
| MAINTENANCE AREA CANDIDATE LIST HList (7) | J3,J5 | J1,J4 | J1,J4 | 6 |
| MAINTENANCE AREA CANDIDATE LIST HList (8) | J3,J5 | J1,J4 | J1,J3,J4 | 7 |
| MAINTENANCE AREA CANDIDATE LIST HList (9) | J1,J3,J4,J5 | J1,J4 | J3,J5 | 8 |
| MAINTENANCE AREA CANDIDATE LIST HList (10) | J1,J4,J5 | J1,J3,J4 | J3,J5 | 8 |
| MAINTENANCE AREA CANDIDATE LIST HList (11) | J1,J4,J5 | J1,J3,J4,J5 | J3,J5 | 9 |
| MAINTENANCE AREA CANDIDATE LIST HList (12) | J1,J4,J5 | J1,J3,J4,J5 | J5 | 8 |

| LIST NAME | MAINTENANCE AREA H (1) | | MAINTENANCE AREA H (2) | | MAINTENANCE AREA H (3) | |
|---|---|---|---|---|---|---|
| | X-COORDINATE OF START POINT | X-COORDINATE OF END POINT | X-COORDINATE OF START POINT | X-COORDINATE OF END POINT | X-COORDINATE OF START POINT | X-COORDINATE OF END POINT |
| MAINTENANCE AREA CANDIDATE LIST HList (2) | 2 | 6 | 7 | 11 | 12 | 1 |
| MAINTENANCE AREA CANDIDATE LIST HList (7) | 7 | 11 | 12 | 4 | 5 | 6 |

| SCHEDULE CANDIDATE NAME | START TIME OF MAINTENANCE AREA H (1) | START TIME OF MAINTENANCE AREA H (2) | START TIME OF MAINTENANCE AREA H (3) | WEIGHT |
|---|---|---|---|---|
| SCHEDULE CANDIDATE S (1) | 05 | 06 | 07 | J(1) 6x8=48, J(4) 6x8=48 J(3) 3x4=12, J(5) 4x4=16 TOTAL 124 |
| SCHEDULE CANDIDATE S (2) | 05 | 07 | 06 | J(1) 6x7=42, J(4) 6x7=42 J(3) 3x5=15, J(5) 4x5=20 TOTAL 119 |
| SCHEDULE CANDIDATE S (3) | 06 | 05 | 07 | J(1) 0, J(4) 6x2=12 J(3) 3x3=15, J(5) 4x3=12 TOTAL 39 |
| SCHEDULE CANDIDATE S (4) | 06 | 07 | 05 | J(1) 6x7=42, J(4) 6x7=42 J(3) 3x5=15, J(5) 4x5=20 TOTAL 119 |
| SCHEDULE CANDIDATE S (5) | 07 | 05 | 06 | J(1) 0, J(4) 6x2=12 J(3) 3x3=15, J(5) 4x3=12 TOTAL 39 |
| SCHEDULE CANDIDATE S (6) | 07 | 06 | 05 | J(1) 6x8=48, J(4) 6x8=48 J(3) 3x4=12, J(5) 4x4=16 TOTAL 124 |
| SCHEDULE CANDIDATE S (7) | 06 | 07 | 08 | J(1) 0, J(4) 6x3=18 J(3) 0, J(5) 4x1=4 TOTAL 22 |
| SCHEDULE CANDIDATE S (8) | 06 | 08 | 07 | J(1) 0, J(4) 6x2=12 J(3) 0, J(5) 4x2=8 TOTAL 20 |
| SCHEDULE CANDIDATE S (9) | 07 | 06 | 08 | J(1) 0, J(4) 6x3=18 J(3) 3x4=12, J(5) 4x4=16 TOTAL 46 |
| SCHEDULE CANDIDATE S (10) | 07 | 08 | 06 | J(1) 0, J(4) 6x2=12 J(3) 0, J(5) 4x2=8 TOTAL 20 |
| SCHEDULE CANDIDATE S (11) | 08 | 06 | 07 | J(1) 0, J(4) 6x3=18 J(3) 3x4=12, J(5) 4x4=16 TOTAL 46 |
| SCHEDULE CANDIDATE S (12) | 08 | 07 | 06 | J(1) 0, J(4) 6x3=18 J(3) 0, J(5) 4x1=4 TOTAL 22 |
| SCHEDULE CANDIDATE S (13) | 07 | 08 | 09 | J(1) 0, J(4) 6x4=24 J(3) 0, J(5) 4x2=8 TOTAL 32 |
| SCHEDULE CANDIDATE S (14) | 07 | 09 | 08 | J(1) 0, J(4) 6x3=18 J(3) 0, J(5) 4x3=12 TOTAL 30 |
| SCHEDULE CANDIDATE S (15) | 08 | 07 | 09 | J(1) 0, J(4) 6x4=24 J(3) 0, J(5) 4x1=4 TOTAL 28 |
| SCHEDULE CANDIDATE S (16) | 08 | 09 | 07 | J(1) 0, J(4) 6x3=18 J(3) 0, J(5) 4x3=12 TOTAL 30 |
| SCHEDULE CANDIDATE S (17) | 09 | 07 | 08 | J(1) 0, J(4) 6x4=24 J(3) 0, J(5) 4x1=4 TOTAL 28 |
| SCHEDULE CANDIDATE S (18) | 09 | 08 | 07 | J(1) 0, J(4) 6x4=24 J(3) 0, J(5) 4x2=8 TOTAL 32 |

FIG. 25

| MAINTENANCE AREA ID | MINIMUM X-COORDINATE VALUE | MAXIMUM X-COORDINATE VALUE | MAINTENANCE START TIME | MAINTENANCE END TIME |
|---|---|---|---|---|
| H(1) | 2 | 6 | 06 | 07 |
| H(2) | 7 | 11 | 09 | 10 |
| H(3) | 12 | 1 | 07 | 08 |

2500

PARALLEL PROCESSING APPARATUS, AND METHOD OF MAINTAINING PARALLEL PROCESSING APPARATUS

CROSS-REFERENCE TO RELATED APPLICATION

This application is based upon and claims the benefit of priority of the prior Japanese Patent Application No. 2017-128051, filed on Jun. 29, 2017, the entire contents of which are incorporated herein by reference.

FIELD

The embodiments discussed herein are related to a parallel processing apparatus and a method of maintaining a parallel processing apparatus.

BACKGROUND

In a parallel processing system, a large scale calculation such as that in a scientific calculation is realized by a parallel calculation using a plurality of computers.

Related techniques are disclosed in Japanese Laid-open Patent Publication No. 2001-184326 or Japanese Laid-open Patent Publication No. 8-16410.

SUMMARY

According to an aspect of the embodiments, a parallel processing apparatus includes: a memory; and a processor coupled to the memory, the processor is configured to: acquire a first time and a second time; divide a plurality of nodes into a plurality of groups; generate a plurality of schedule candidates each which assigns time zones corresponding to a length of time used to perform a maintenance operation at one or more nodes included in the plurality of groups in a time period from the first time to the second time to the plurality of groups such that no overlap occurs among the plurality of groups; evaluate the plurality of schedule candidates based on one or more process execution schedules of the one or more nodes in the time period; and output one schedule candidate of the plurality of schedule candidates based on a result of the evaluation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram for use in illustrating the first embodiment;

FIG. 9 is a diagram for use in illustrating the first embodiment;

FIG. 10 is a diagram for use in illustrating the first embodiment;

FIG. 14 is a diagram for use in illustrating the first embodiment;

FIG. 19 is a diagram for use in illustrating a second embodiment;

FIG. 20 is a diagram for use in illustrating the second embodiment;

FIG. 21 is a diagram for use in illustrating the second embodiment;

FIG. 22 is a diagram for use in illustrating the second embodiment;

FIG. 23 is a diagram for use in illustrating the second embodiment;

FIG. 25 is a diagram for use in illustrating the second embodiment.

DESCRIPTION OF EMBODIMENTS

A computer is called, for example, a node. In a parallel processing system, a management computer is provided and the management computer determines in advance which computer is to execute a job in which time zone, and manages a schedule of executing the by the computer.

For example, parallel processing is performed among processors such as a processor performing data processing requested by a first job, a processor executing a second job which is lower in priority than the first job, and an idle processor performing data processing in response to a request. For example, jobs waiting to be executed and jobs in progress of execution are managed using a plurality of job queues. An affiliation queue and an intra-queue priority are set depending on a system resource requested by each job, a waiting time, and other factors.

For example, when a maintenance operation is performed at a node, the maintenance operation at the node may exert an adverse effect on a process scheduled to be executed at the node. For example, a process scheduled to be executed at a node may not be started until a maintenance operation at the node is completed, that is, a delay may occur in starting of executing the process scheduled to be executed at the node.

For example, it may be desirable to provide a parallel processing apparatus capable of suppressing an adverse effect of a maintenance operation at a node on a process planned to be executed on a node.

Figure 1:
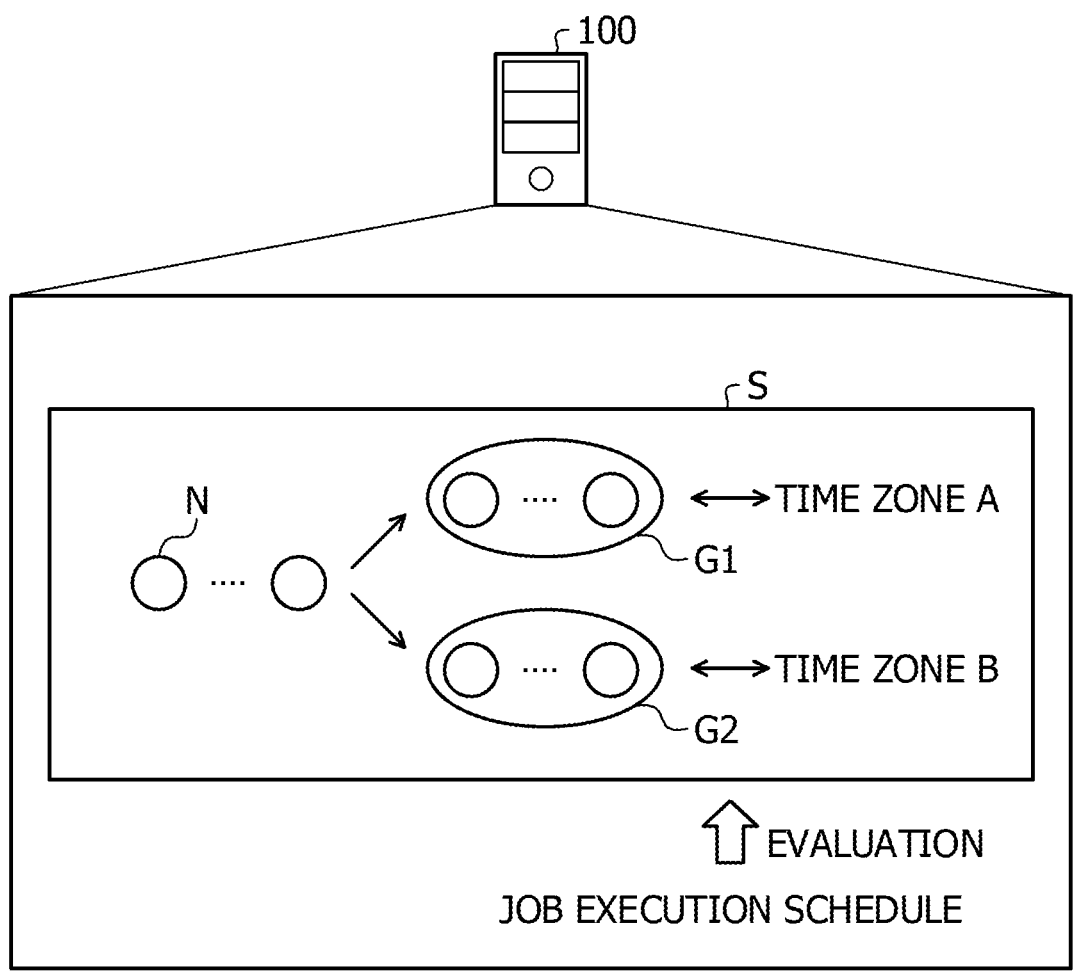
FIG. 1 illustrates an example of maintaining a parallel processing apparatus.

FIG. 1 illustrates an example of a maintenance method performed by a parallel processing apparatus. In FIG. 1, a parallel processing apparatus 100 is a computer that manages maintenance operations at a plurality of nodes N included in a parallel processing system. The maintenance operations may include, for example, upgrading of system software at nodes N, or the like. The system software is, for example, an OS (Operation System) or the like.

In the parallel processing system, a management node is provided, and the management node makes a determination in advance as to which node is to execute a job in which time zone, and the management node manages the schedule of executing jobs at nodes. The management node performs, for example, using a job scheduler, scheduling of a job in response to an execution request issued via a terminal apparatus by a user of the parallel processing system. When a scheduled job execution start time comes, the management node controls one or more nodes to execute the job.

In a case where the parallel processing system is used by many users, there is a tendency for a user to issue a job execution request to a job scheduler via a terminal apparatus in such a manner that the user specifies the number of nodes the user wants to use and specifies a length of a period during which the user wants the job to be executed. In response, the job scheduler reserves the specified number of nodes and a time zone with the specified length for execution of the job, and determines a job execution schedule and notifies the user of the determined job execution schedule. For further information on the job scheduler, see, for example, Etsion, Yoav, and Dan Tsafrir "A short survey of commercial cluster batch schedulers." School of Computer Science and Engineering, The Hebrew University of Jerusalem 44221 (2005), 2005-13.

In the parallel processing system, there is a possibility that maintenance operation is performed on a plurality of nodes. In this case, in the parallel processing system, it may be desirable to consider issues (1) to (5) described below.

(1) After the job scheduler determines a job execution schedule, if a change occurs in a status of a parallel processing system owing to an execution of a maintenance operation at a node or the like, this may cause the job not to be executed according to the determined schedule, and a delay may occur in the job execution start time from the scheduled execution start time. As the delay in the job execution start time from the scheduled execution start time increases, the probability increases that a hindrance occurs in a work or a research activity of a user which may result in an increase in the probability that breach of contract with a user occurs. Therefore, it is desirable to suppress the delay in the job execution start time from the scheduled execution start time.

(2) In the parallel processing system, from the point of view of suppressing the relative cost of the network to the cost of nodes to a sufficiently low level, a network topology in the form of a mesh or a torus may be employed. To avoid interference between communications of different jobs, it is desirable that one or more nodes assigned to jobs are configured in the form of a submesh or a subtorus.

(3) In the parallel processing system, when a maintenance operation at a node is performed, it may be desired that a job, requested by a user to be executed, is not executed at a node when the maintenance operation at the node is in progress. For example, depending on a purpose of a job requested by a user to be executed or depending on a content of the maintenance operation, it may be desired not to execute the job, requested by the user to be executed, on a node being subjected to the maintenance operation.

(4) In a case where a maintenance operation is relatively low in emergency, it may be desirable that instead of simultaneously executing the maintenance operation at all nodes, the maintenance operation is executed progressively such that the maintenance operation is executed at some nodes at a time and then at some other nodes and so on thereby making it possible for the whole parallel processing system not to fall into an unusable state over a certain period. For example, it may be desirable that a period during which executing of the maintenance operation is allowed is set to be longer than a minimum maintenance operation period, and the maintenance operation is executed progressively in the period on a part-by-part basis such that the maintenance operation is executed for some nodes at a time and for some other nodes next, and so on.

(5) In a case where the maintenance operation is executed progressively on a part-by-part basis, this may cause an occurrence, in the middle of the maintenance operation, of a situation in which the maintenance operation is completed for some nodes but the maintenance operation is not yet performed for the other nodes, and thus the system software may not be compatible among the nodes. When nodes are not compatible in system software, it is not allowed to assign such nodes to the same job, and thus it may be desirable that the maintenance operation is executed progressively on a part-by-part base thereby reducing the probability that the system software is not compatible among the nodes.

In the parallel processing system, as described above, when a maintenance operation is executed at a plurality of nodes, it is desirable to assign one or more nodes to a job in an efficient manner while suppressing an adverse effect of the maintenance operation at the nodes on the job scheduled to be executed at the nodes.

For example, a maintenance method may be provided in which an evaluation is made on a plurality of schedules in each of which a plurality of nodes are divided into a plurality of groups, and a maintenance operation is executed progressively from one group to another while shifting a time zone assigned to the maintenance operation in a particular period wherein the evaluation is made based on an influence on a process scheduled to be executed in the particular period.

The parallel processing apparatus 100 acquires maintenance information. The maintenance information includes, for example, a first time and a second time. The first time is a start time of a period during which a maintenance operation is allowed to be performed. The second time is an end time of the period during which the maintenance operation is allowed to be performed. Each of the times may by specified by hours or hours and minutes. In addition, in each time, a date may be specified.

The parallel processing apparatus 100 generates a plurality of schedule candidates each defining a schedule of performing a maintenance operation at respective nodes N of a plurality of nodes N during a period from the acquired first time to the second time. The schedule candidate is information defining a schedule such that a plurality of nodes N are divided into a plurality of groups, and time zones each having a length of time to be spent to perform the maintenance operation at nodes N in one group are allocated in the period from the acquired first time to the second time, and the time zones are assigned to the respective groups such that no overlap occurs between the groups. The particular period may be defined in units of seconds, minutes, hours, days, or the like.

A schedule candidate S defines a schedule of executing maintenance operations, for example, such that a plurality of nodes N are divided into groups G1 and G2, and a time zone A in the period from the first time to the second time is assigned to the group G1 and a time zone B in the period is assigned to the group G2.

The parallel processing apparatus 100 acquires the schedule of executing a process at nodes N in the period from the acquired first time to the second time. The process is, for example, a job. The execution schedule includes, for example, a scheduled process execution start time. The execution schedule may include, for example, a scheduled process execution end time.

The parallel processing apparatus 100 evaluates each schedule candidate of the plurality of generated schedule candidates based on the schedule of performing the process at nodes N in the period from the acquired first time to the second time. For example, the parallel processing apparatus 100 calculates an evaluation value of each schedule candidate such that the evaluation value increases with increasing delay in the process execution start time at nodes N from the scheduled execution start time.

Based on a result of the evaluation, the parallel processing apparatus 100 outputs one schedule candidate of the plurality of schedule candidates. For example, the parallel processing apparatus 100 outputs a schedule candidate having a lowest calculated evaluation value. The parallel processing apparatus 100 adjusts the schedule of executing the process at the plurality of nodes N based on the output schedule candidate, and controls the plurality of nodes N to execute the maintenance operation.

Thus, in the parallel processing apparatus 100, a plurality of nodes N are divided into a plurality of groups, and a maintenance operation is performed progressively from one group to another, and thus it is possible to assign one or more nodes N to processing a process in an efficient manner while suppressing an adverse effect of the maintenance operation at the nodes N on the process scheduled to be executed at the nodes N.

In the parallel processing apparatus 100, for example, each schedule candidate is evaluated based on a schedule of executing a process at nodes N, and thus it is possible to suppress a delay of a process execution start time from an original scheduled execution start time. Thus, the parallel processing apparatus 100 provides an improved convenience in the parallel processing system.

In the parallel processing apparatus 100, when a plurality of nodes N are divided into a plurality of groups, it is possible to perform the grouping such that one or more nodes N in the form of a submesh or a subtorus are included in each group. Therefore, in the parallel processing apparatus 100, after a maintenance operation at one or more nodes N included in a group is completed, the one or more nodes N included in the group may all be assigned to performing a process. Thus, it is possible to achieve a reduction in interference with communication in other processes.

In the parallel processing apparatus 100, schedules of executing processes at a plurality of nodes N are adjusted based on the output schedule candidate, and thus it is possible to control the execution of processes such that a process requested to be executed by a user is not executed at a node N when the node N is being subjected to a maintenance operation. Therefore, in the parallel processing apparatus 100, it is possible to reduce a probability that either the maintenance operation or the process requested to be executed by the user falls in an unstable state.

In the parallel processing apparatus 100, for example, a plurality of nodes N are divided into a plurality of groups, and a maintenance operation is executed progressively from one group to another such that the whole parallel processing system does not fall into an unusable state for a certain period. Thus, the parallel processing apparatus 100 is capable of providing an improved convenience in the parallel processing system.

In the parallel processing apparatus 100, when time zones each having a length of time to be spent to perform the maintenance operation at nodes N included in one group are assigned such that no overlap occurs among the groups, the time zones are assigned to the respective groups such that the time zones are continuous. Thus, in the parallel processing apparatus 100, the maintenance operation is executed progressively on a group-by-group base such that a situation hardly occurs in which the system software is not compatible among the nodes N.

For example, the parallel processing apparatus 100 generates a plurality of schedule candidates and evaluates each schedule candidate. For example, the parallel processing apparatus 100 may acquire a plurality of schedule candidates prepared in advance or may use a plurality of schedule candidates generated in the past, and may evaluate each schedule candidate.

Figure 2:
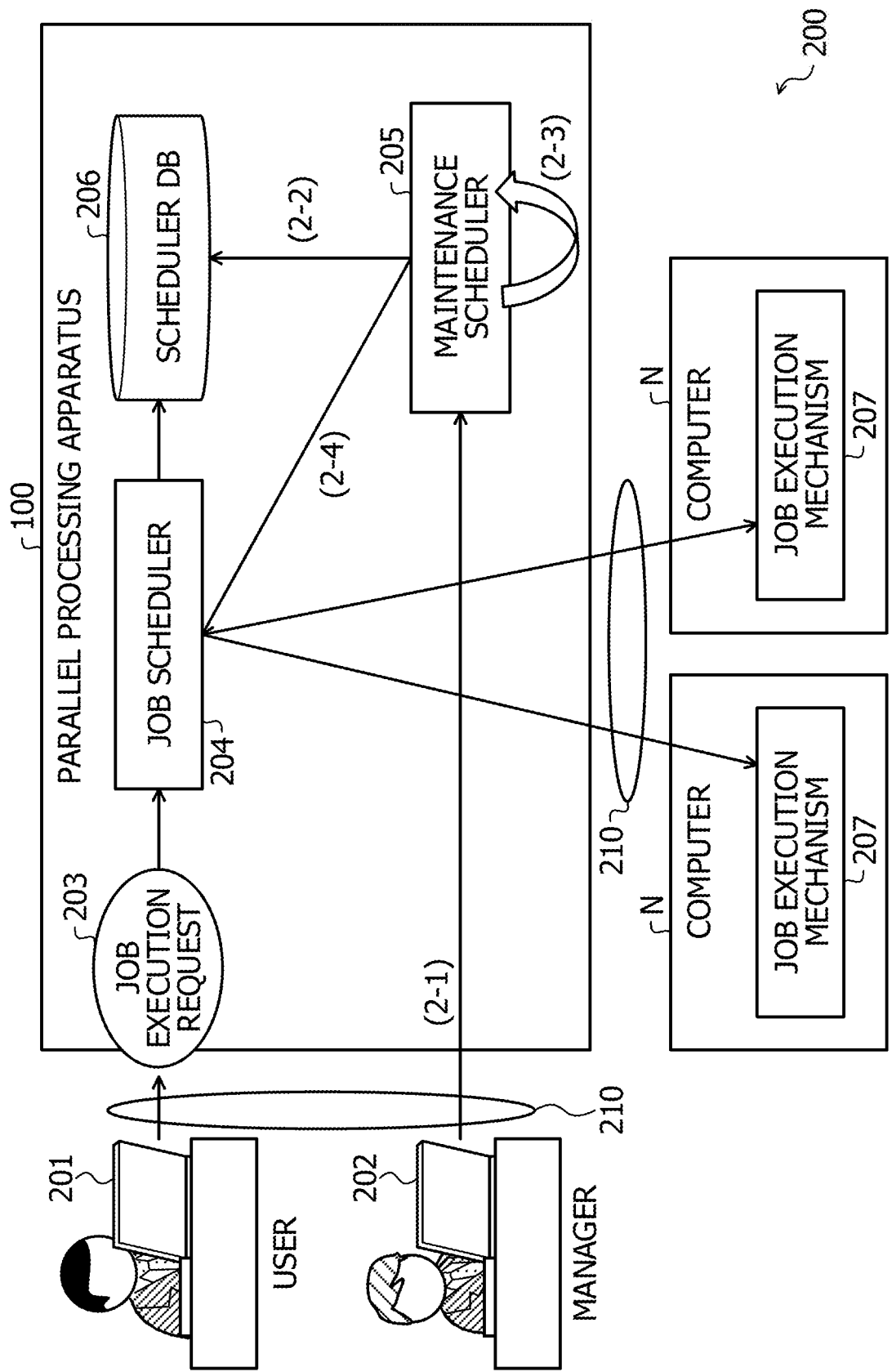
FIG. 2 illustrates an example of a parallel processing system.

FIG. 2 illustrates an example of a parallel processing system. In FIG. 2, a parallel processing system 200 includes a parallel processing apparatus 100, a user apparatus 201, a manager apparatus 202, and a plurality of nodes N.

In the parallel processing system 200, the parallel processing apparatus 100, the user apparatus 201, and the manager apparatus 202 are connected to each other via a wired or wireless network 210. In the parallel processing system 200, the parallel processing apparatus 100 is connected to each node N of the plurality of nodes N via a wired or wireless network 210. The network 210 is, for example, a LAN (Local Area Network), a WAN (Wide Area Network), the Internet, or the like. In the parallel processing system 200, the plurality of nodes N are connected in the form of a one-dimensional torus.

The parallel processing apparatus 100 includes a job scheduler 204 that accepts a job execution request 203 and manages execution of jobs at nodes N. The parallel processing apparatus 100 includes a maintenance scheduler 205 that manages execution of maintenance operations at nodes N. The parallel processing apparatus 100 includes a schedule DB (Data Base) 206 that stores schedule information.

The schedule information includes, for example, information indicating a usage status of nodes N, information indicating job execution schedules, and the like. The schedule information may include information indicating a job execution history. The job execution history includes, for example, the number of nodes N that have been used by jobs.

When the job scheduler 204 accepts a job execution request 203, the job scheduler 204 performs job scheduling based on the schedule information stored in the schedule DB 206. When a scheduled job execution start time comes, the job scheduler 204 instructs one or more nodes N to execute a job.

(2-1) The maintenance scheduler 205 receives a maintenance request including maintenance information from the manager apparatus 202. The maintenance information includes, for example, a first time and a second time. The first time is a start time of a period in which executing of a maintenance operation is allowed, and the second time is an end time of the period in which executing of the maintenance operation is allowed. Hereinafter, the start time of the period in which maintenance operation execution is allowed may be referred to as "maintenance start time", the end time of the period in which maintenance operation execution is allowed may be referred to as "maintenance end time", and the period in which maintenance operation execution is allowed may be referred to as "scheduled maintenance period". The maintenance information may further include information indicating a length of the particular time spent to execute a maintenance operation at a node N. The particular time that is to be spent to execute a maintenance operation at a node N may be referred to as "maintenance time".

(2-2) The maintenance scheduler 205 generates a plurality of group lists indicating a result of dividing a plurality of nodes N into a plurality of groups based on the schedule information stored in the schedule DB 206. Hereinafter, the group may be referred to as a "maintenance area candidate", and the group list may be referred to as a "maintenance area candidate list".

(2-3) The maintenance scheduler 205 generates a plurality of schedule candidates in which time zones, each having a length of a maintenance time to be spent to perform a maintenance operation at a node N, are assigned to respective maintenance areas such that no overlap occurs among the maintenance areas for each maintenance area candidate list of the generated plurality of maintenance area candidate lists. Hereinafter, the time zone with the length of the maintenance time during which the maintenance operation at the node N is to be performed may be referred to as a "maintenance time zone".

The maintenance scheduler 205 may generate a plurality of schedule candidates such that one maintenance area candidate list is selected from the plurality of generated maintenance area candidate lists, and a time zone of a maintenance time during which a maintenance operation at a node N is to be performed is assigned to each maintenance area such that no overlap occurs.

(2-4) The maintenance scheduler 205 transmits a re-scheduling request including one of schedule candidates to the job scheduler 204. The job scheduler 204 performs re-scheduling based on the one of schedule candidates. The parallel processing apparatus 100 is, for example, a server, a PC (Personal Computer), or the like.

The user apparatus 201 is a computer used by a user of the parallel processing system 200. The user apparatus 201 accepts specifications, from a user, in terms of a shape of one or more nodes N used in job execution, a length of a period in which the one or more nodes N are used, and the like, and transmits a job execution request 203 to the parallel processing apparatus 100. For example, the user apparatus 201 transmits the job execution request 203 to the job scheduler 204 of the parallel processing apparatus 100. The user apparatus 201 is, for example, a PC, a notebook PC, a tablet terminal, a smartphone, or the like.

The manager apparatus 202 is a computer used by a manager of the parallel processing system 200. The manager apparatus 202 accepts, from the manager, a specification of maintenance information and transmits a maintenance request to the parallel processing apparatus 100. For example, the manager apparatus 202 transmits the maintenance request to the maintenance scheduler 205 of the parallel processing apparatus 100. The manager apparatus 202 is, for example, a PC, a notebook PC, a tablet terminal, a smartphone, or the like.

The node N is a computer that executes a job under the control of the job scheduler 204. The node N includes, for example, a job execution mechanism 207, and executes a job using the job execution mechanism 207. The node N executes a maintenance operation under the control of the job scheduler 204. The node N is, for example, a server, a PC, or the like.

For example, the parallel processing apparatus 100 includes the job scheduler 204. For example, the parallel processing apparatus 100 may not include the job scheduler 204. In this case, for example, the parallel processing apparatus 100 is capable of communicating with another computer including the job scheduler 204, the parallel processing apparatus 100 may request this computer to manage the job execution schedule.

Figure 3:
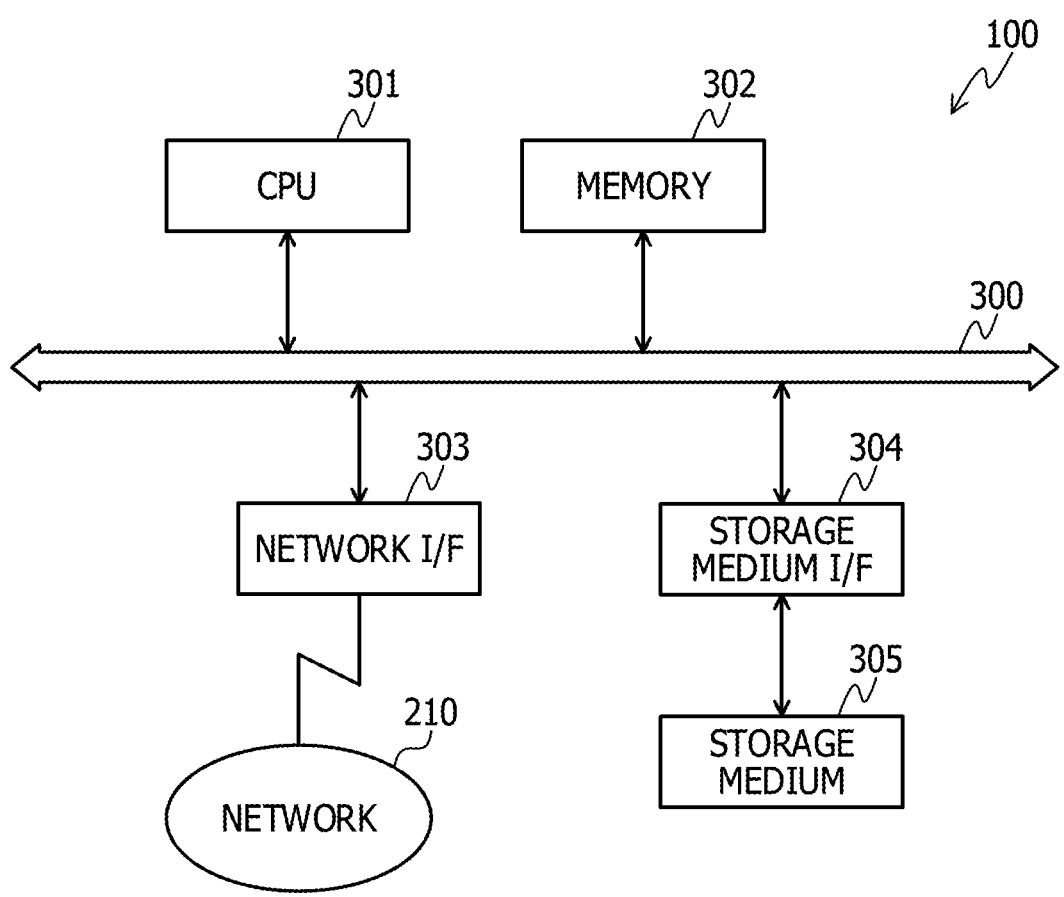
FIG. 3 illustrates an example of a hardware configuration of a parallel processing apparatus.

FIG. 3 illustrates an example of a hardware configuration of the parallel processing apparatus. In FIG. 3, the parallel processing apparatus 100 includes a CPU (Central Processing Unit) 301, a memory 302, a network I/F (Interface) 303, a storage medium I/F 304, and a storage medium 305. These elements are connected to each other via bus 300.

The CPU 301 is responsible for controlling the whole parallel processing apparatus 100. The memory 302 includes, for example, a ROM (Read Only Memory), a RAM (Random Access Memory), and a flash ROM, or the like. For example, the flash ROM or the ROM stores various programs, and the RAM is used as a work area of the CPU 301. The programs stored in the memory 302 are loaded into the CPU 301, and processes coded in the programs are executed by the CPU 301.

The network I/F 303 is connected to the network 210 via a communication line, and further connected to another computer via the network 210. The network I/F 303 provides an interface between the network 210 and the inside of the parallel processing apparatus 100 and controls inputting/outputting of data from/to another computer. As for the network I/F 303, for example, a modem, a LAN adapter, or the like may be employed.

Under the control of the CPU 301, the storage medium I/F 304 controls reading/writing of data from/to the storage medium 305. The storage medium I/F 304 is, for example, a disk drive, an SSD (Solid State Drive), a USB (Universal Serial Bus) port, or the like. The storage medium 305 is a non-volatile memory adapted to store data written under the control of the storage medium I/F 304. The storage medium 305 is, for example, a disk, a semiconductor memory, a USB memory, or the like. The storage medium 305 may be removable from the parallel processing apparatus 100.

The parallel processing apparatus 100 may further include, in addition to the elements described above, for example, a keyboard, a mouse, a display, a printer, a scanner, a microphone, a speaker, and/or the like. The parallel processing apparatus 100 may not include the storage medium I/F 304 and the storage medium 305.

The hardware configuration of the user apparatus 201 may be the same, for example, as the hardware configuration of the parallel processing apparatus 100 illustrated in FIG. 3.

The hardware configuration of the manager apparatus 202 may be the same, for example, as the hardware configuration of the parallel processing apparatus 100 illustrated in FIG. 3.

The hardware configuration of the node N may be the same, for example, as the hardware configuration of the parallel processing apparatus 100 illustrated in FIG. 3.

Figure 4:
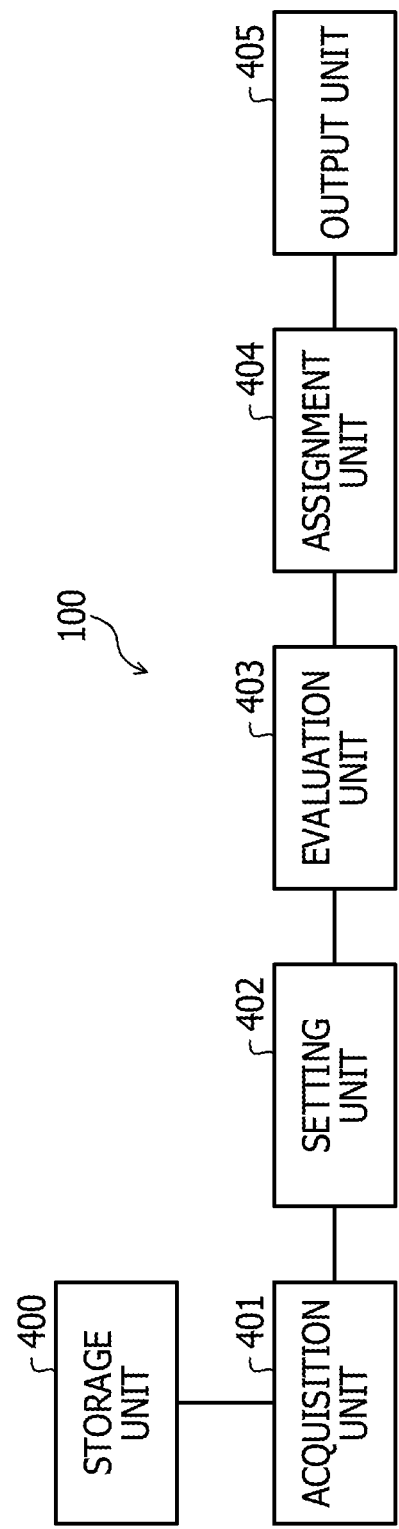
FIG. 4 illustrates an example of a functional configuration of a parallel processing apparatus.

FIG. 4 illustrates an example of a functional configuration of the parallel processing apparatus. The parallel processing apparatus 100 includes an acquisition unit 401, a setting unit 402, an evaluation unit 403, an assignment unit 404, and an output unit 405.

The storage unit 400 may be realized, for example, by a storage area of the memory 302 or the storage medium 305 illustrated in FIG. 3.

Units from the acquisition unit 401 to the output unit 405 provides functions of a control unit. More specifically, the functions of the functional units from the acquisition unit 401 to the output unit 405 are realized, for example, by executing, on the CPU 301, a program stored in a storage area of the memory 302 or the storage medium 305 illustrated in FIG. 3 or by the network I/F 303. Results of processes performed by the respective functional units are stored, for example, in a storage area such as the memory 302 or the storage medium 305 illustrated in FIG. 3.

The storage unit 400 stores management information about a plurality of nodes N realizing the parallel processing system 200. The plurality of nodes N are connected, for example, in the form of a one-dimensional torus. The management information includes, for example, information indicating coordinates of the nodes N, a connection relationship among the nodes N, and the like. The storage unit 400 stores the schedule information. The schedule information includes, for example, information indicating a usage status of nodes N, information indicating a process execution schedule to be performed at nodes N, and the like. The process is, for example, a job.

The storage unit 400 stores maintenance information. The maintenance information includes, for example, a first time and a second time. The first time is a maintenance start time of a scheduled maintenance period. The second time is a maintenance end time of the scheduled maintenance period. The scheduled maintenance period is a period in which executing of the maintenance operation is allowed. The maintenance information may further include a length of a maintenance time. The maintenance time is a particular time that is to be spent to execute the maintenance operation at the node N. The storage unit 400 stores a specific number indicating a preferable number of nodes N to be included in one of groups into which a plurality of nodes N are to be divided. Thus, the storage unit 400 makes it possible for the respective functional units to refer to information used in processes performed by the functional units.

The acquisition unit 401 acquires the first time and the second time. The acquisition unit 401 acquires, for example, the maintenance start time and the maintenance end time of the scheduled maintenance period. More specifically, the acquisition unit 401 receives, from the manager apparatus 202, the maintenance information including the maintenance start time and the maintenance end time of the scheduled maintenance period. Thus, the acquisition unit 401 is capable of determining whether executing of a maintenance operation in one of periods is allowed.

The setting unit 402 generates a plurality of schedule candidates. The schedule candidate is information defining a schedule such that a plurality of nodes N are divided into a plurality of groups, and time zones each having a length to be spent to perform the maintenance operation at nodes N in one group are assigned, in the scheduled maintenance period, to the respective groups such that no overlap occurs between the groups. The maintenance time zone is a time zone with a length corresponding to the maintenance time spent to perform the maintenance operation at the node N.

For example, the setting unit 402 generates the plurality of schedule candidates according to a first condition based on process execution schedule at nodes N in scheduled maintenance periods described in the schedule information. The first condition is, for example, that the respective groups include a minimized number of nodes N at which a process is to be executed in the scheduled maintenance period.

For example, the setting unit 402 generates a plurality of schedule candidates in which a plurality of nodes N are divided into a plurality of groups such that each group includes a minimized number of nodes N at which there is a process scheduled to be executed in a scheduled maintenance period. Thus, the setting unit 402 is capable of generating a plurality of schedule candidates that are relatively preferable from the point of view of suppressing an adverse effect on the job execution schedule. That is, the setting unit 402 does not generate a schedule candidate that is not relatively preferable. Thus, in the setting unit 402, the number of schedule candidates to be evaluated by the evaluation unit 403 is reduced, and thus a reduction in the amount of processing in the evaluation by the evaluation unit 403 is achieved.

For example, the setting unit 402 generates a plurality of schedule candidates according to a second condition based on information, included in the management information, indicating coordinates of the nodes N and a connection relationship among the nodes N. The second condition is, for example, that at least one group of the plurality of groups includes as many nodes N as a number equal to or greater than a predetermined number.

More specifically, the setting unit 402 generates a plurality of schedule candidates in which a plurality of nodes N are divided into a plurality of groups such that at least one group of the plurality of groups includes as many nodes N as a number equal to or greater than the specific number. As a result of this setting made by the setting unit 402, once executing of a maintenance operation at nodes N included in one of groups is completed, it becomes possible to use as many nodes N as the specific number. This results in a reduction in the probability that a sufficient number of nodes N for use by a process are not available.

For example, the setting unit 402 generates the plurality of schedule candidates according to a third condition based on information, included in the management information, indicating coordinates of the nodes N and a connection relationship among the nodes N. The third condition is, for example, that at least one group of the plurality of groups includes a plurality of nodes N that are connected continuously.

For example, the setting unit 402 generates the plurality of schedule candidates in which a plurality of nodes N are divided into a plurality of groups such that at least one group of the plurality of groups includes two or more continuously connected nodes N. As a result of this setting made by the setting unit 402, once executing of a maintenance operation at nodes N included in one of groups is completed, it becomes possible to use two or more continuously connected nodes N. This makes it possible for the setting unit 402 to handle a case in which a process uses one or more nodes N disposed in the form of a submesh or a subtorus, and thus it becomes possible to suppress interference with communication in other processes.

For example, the setting unit 402 generates the plurality of schedule candidates according to a fourth condition. The fourth condition is, for example, that maintenance time zones each having a length of time corresponding to the maintenance time are continuously allocated in the scheduled maintenance period and assigned to the respective groups such that no overlap occurs among the groups.

For example, the setting unit 402 generates the plurality of schedule candidates in each of which maintenance time zones each having a length of time corresponding to the maintenance time are continuously allocated in the scheduled maintenance period and assigned to the respective groups such that no overlap occurs among the groups. As a result of this setting made by the setting unit 402, it becomes possible to execute the maintenance operation progressively on a group-by-group base such that a situation hardly occurs in which the system software is not compatible among the nodes N.

The setting unit 402 may generate the plurality of schedule candidates according to one or more of conditions of the first to fourth conditions. The setting unit 402 may generate the plurality of schedule candidates according to all conditions of the first to fourth conditions.

The setting unit 402 sets, based on the average number of nodes N used in processes in the past, a specific number indicating a preferable number of nodes N included in one of groups. For example, the setting unit 402 sets the average number of nodes N used in processes in the past as the specific number indicating a preferable number of nodes N included in one of groups, and stores the specific number in the storage unit 400. Thus, the setting unit 402 is capable of automatically setting a proper value as the specific number indicating the preferable number of nodes N included in one of groups based on the average number of nodes N used in processes in the past.

The evaluation unit 403 evaluates each schedule candidate of the plurality of schedule candidates based on the process execution schedule at nodes N in the scheduled maintenance period. For example, the evaluation unit 403 calculates an evaluation value for each schedule candidate such that the evaluation value increases with increasing delay in the process execution start time at nodes N from the scheduled execution start time. Thus, the evaluation unit 403 is capable of evaluating the schedule candidates such that a relatively low evaluation value is given to a schedule candidate that does not impose a significant adverse effect on a process scheduled to be executed at nodes N.

The assignment unit 404 outputs one schedule candidate of the plurality of schedule candidates based on a result of the evaluation. For example, the assignment unit 404 performs control such that a plurality of nodes N are divided into a plurality of groups and a maintenance operation is performed progressively on a group-by-group basis based on one of the schedule candidates, the process execution schedule at nodes N in the scheduled maintenance period is changed, and the schedule information stored in the storage unit 400 is updated.

For example, the assignment unit 404 performs control such that based on a schedule candidate having a lowest evaluation value, a plurality of nodes N are divided into a plurality of groups, and a maintenance operation is performed progressively on a group-by-group basis. The assignment unit 404 controls the job scheduler 204 according to the schedule candidate having the lowest evaluation value such that the process execution schedule at nodes N in the scheduled maintenance period is changed and the schedule information stored in the storage unit 400 is updated. Thus, the assignment unit 404 is capable of re-assigning one or more nodes N to a process in an efficient manner while suppressing an adverse effect of the maintenance operation at the nodes N on the process scheduled to be executed by the nodes N.

The output unit 405 outputs a result of a process performed by each functional unit. A proper output format may be employed depending on specific information to be output to a specific output destination such as displaying information on a display, outputting print information to a printer, transmitting information to an external apparatus via the network I/F 303, or storing information in a storage area such as the memory 302 or the storage medium 305. For example, the output unit 405 transmits the result of the process performed by each functional unit to the manager apparatus 202. This makes it possible for a manager to get to know the result of the processes performed by each functional unit and to use the result of the processes in management of the parallel processing system 200.

In a case where the parallel processing apparatus 100 does not have the job scheduler 204, the output unit 405 may transmit information indicating a schedule candidate having the lowest evaluation value to another computer having a job scheduler. Thus, the output unit 405 is capable of requesting a computer having a job scheduler to perform the maintenance operation such that a plurality of nodes N are divided into a plurality of groups and the maintenance operation is performed progressively on a group-by-group basis.

Referring to FIGS. 5 to 14, a first embodiment is described below. In the first embodiment, the number of nodes N realizing the parallel processing system 200 is divisible by the specific number indicating the preferable number of nodes N that are to be included per one maintenance area.

In the first embodiment, the parallel processing system 200 includes twelve nodes N. The twelve nodes N are connected in the form of a one-dimensional torus. Each node N is assigned a coordinate X. Hereinafter, when the nodes N are distinguished from each other, a notation "node Nx" may be used. It is assumed by way of example that the maintenance start time is 05 and the maintenance end time is 10. The time is divided into intervals with a length of, for example, one hour. It is assumed by way of example that the maintenance time has a length of one unit time.

Figure 5:
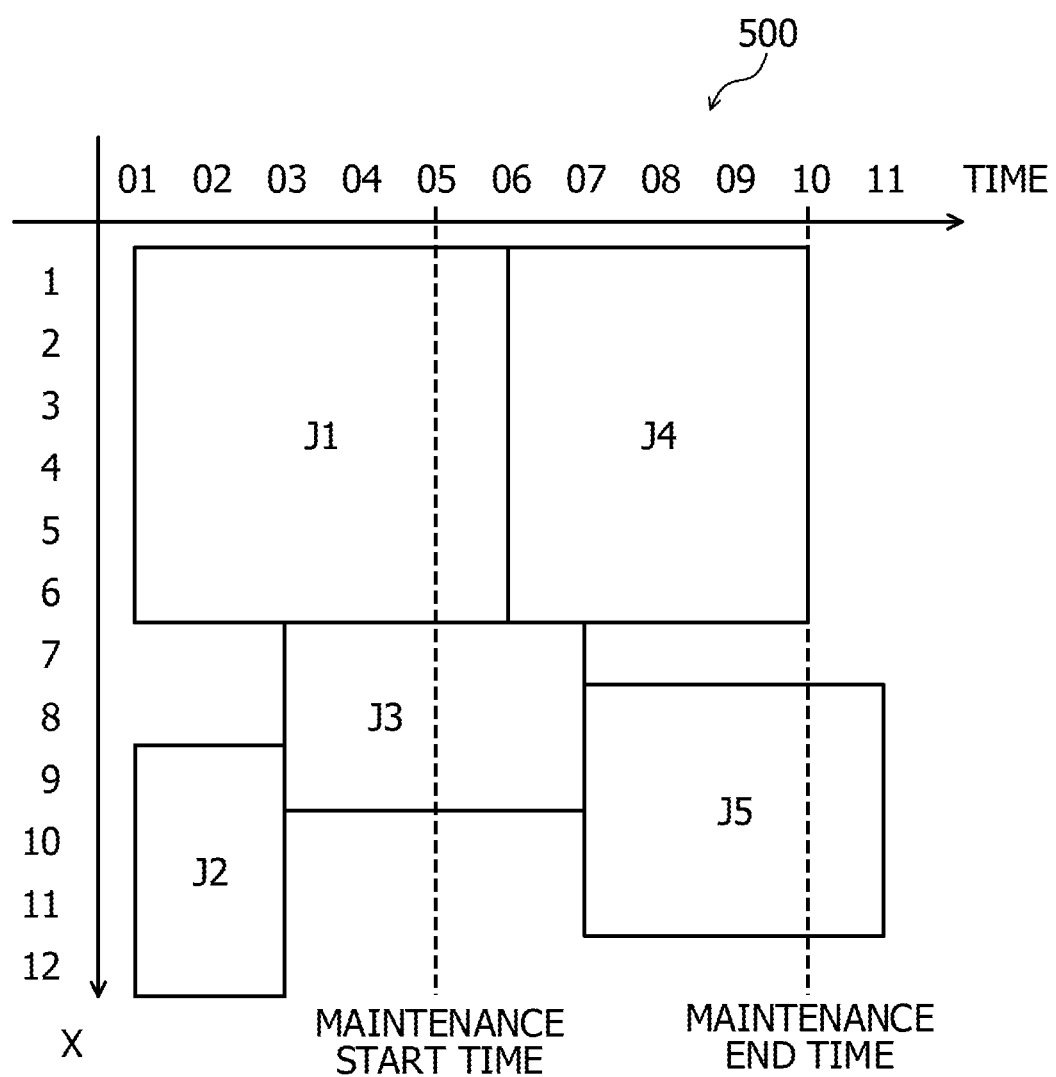
FIG. 5 is a diagram for use in illustrating a first embodiment.

FIG. 5 illustrates a job execution schedule of a plurality of jobs at a plurality of nodes N in an initial state according to the first embodiment. For example, in FIG. 5, a graph 500 illustrates the execution schedule of the plurality of jobs at the plurality of nodes N. In the graph 500 illustrated in FIG. 5, a vertical axis represents the coordinate of the node N. In the graph 500 illustrated in FIG. 5, a horizontal axis represents time from 01 to 11.

In the graph 500 illustrated in FIG. 5, rectangles respectively indicate which nodes N is assigned to which job in which time zone. In the graph 500 illustrated in FIG. 5, the vertical length of each rectangle indicates the number of nodes N assigned to a job. In the graph 500 illustrated in FIG. 5, the horizontal length of each rectangle indicates the length of a time zone assigned to a job.

In FIG. 5, for example, there is an execution schedule in which a job J1 is assigned nodes N1 to N6 and a time zone from time 01 to time 06. There is an execution schedule in which a job J2 is assigned nodes N9 to N12 and a time zone from time 01 to time 03. There is an execution schedule in which a job J3 is assigned nodes N7 to N9 and a time zone from time 03 to time 07. There is an execution schedule in which a job J4 is assigned nodes N1 to N6 and a time zone from time 06 to time 10. There is an execution schedule in which a job J5 is assigned nodes N8 to N11 and a time zone from time 07 to time 11.

Figure 6:
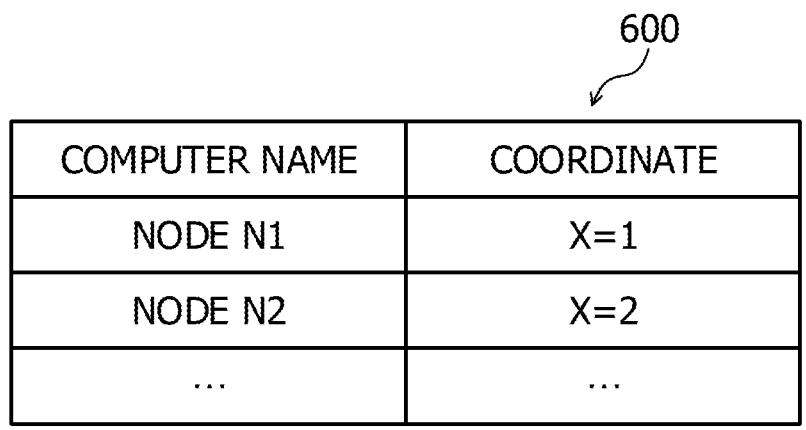
FIG. 6 is a diagram for use in illustrating the first embodiment.

FIG. 6 illustrates an example of a content stored in a node management DB 600 in terms of coordinates of nodes N. The parallel processing apparatus 100 stores the coordinates of the nodes N described above using the node management DB 600. The node management DB 600 is realized, for example, by a storage area such as a memory 302, a storage medium 305, or the like of the parallel processing apparatus 100 illustrated in FIG. 3.

As illustrated in FIG. 6, the node management DB 600 includes fields in which a computer name and a coordinate are described. In the node management DB 600, information is set in each field for each node N thereby storing node N management information in a record.

In each computer name field, a name identifying a node N is set. An example of a name identifying a node N is "Nx". Example of names identifying nodes N are "N1 to N12". In each coordinate field, a coordinate of a node N is set. An example of a coordinate of a node N is "X".

FIG. 7 illustrates an example of a content stored in an execution schedule DB 700 in which execution schedules of a plurality of jobs are stored. The parallel processing apparatus 100 stores the execution schedules of the plurality of jobs described above using the execution schedule DB 700. The execution schedule DB 700 is realized, for example, by a storage area such as the memory 302, the storage medium 305, or the like of the parallel processing apparatus 100 illustrated in FIG. 3.

As illustrated in FIG. 7, the execution schedule DB 700 includes fields for describing an ID, a maximum X-coordinate (Xmax), a minimum X-coordinate (Xmin), a scheduled job execution start time (Jstart), and a scheduled job execution end time (Jend). The execution schedule DB 700 sets information in each field for each job thereby storing execution schedule information in a record.

In each ID field, an ID identifying a job is set. In each maximum X-coordinate field, a maximum value of coordinates of nodes N assigned to the job indicated by the ID. In each minimum X-coordinate field, a minimum value of coordinates of nodes N assigned to the job indicated by the ID.

In each scheduled job start time field, a start time of a time zone assigned to the job indicated by the ID, that is, a scheduled execution start time, at which the execution of the job indicated by the ID is to be started, is set. In each scheduled job end time field, an end time of the time zone assigned to the job indicated by the ID, that is, a scheduled execution end time, at which the execution of the job indicated by the ID is to be ended, is set.

Figure 8:
FIG. 8 is a diagram for use in illustrating the first embodiment.

FIG. 8 illustrates an example of a content stored in a maintenance information DB 800 in which maintenance information is stored. The parallel processing apparatus 100 stores the maintenance information described above using the maintenance information DB 800. The maintenance information DB 800 is realized, for example, by a storage area such as the memory 302, the storage medium 305, or the like of the parallel processing apparatus 100 illustrated in FIG. 3.

As illustrated in FIG. 8, the maintenance information DB 800 includes fields for describing a maintenance start time (Hstart), a maintenance end time (Hend), and a maintenance time per execution (Hlong). In the maintenance information DB 800, information is set in each field thereby storing the maintenance information in a record.

In each maintenance start time field, a start time of a scheduled maintenance period in which executing of a maintenance operation is allowed is set. In each maintenance end time field, an end time of the scheduled maintenance period in which executing of the maintenance operation is allowed is set. In each maintenance time per execution field, a particular time used to perform the maintenance operation is set.

Figure 11:
FIG. 11 is a diagram for use in illustrating the first embodiment.

Referring to FIGS. 9 to 11, an example of a generation of a maintenance area candidate list is described below. In FIGS. 9 to 11, to makes it easy to reduce the probability that a sufficient number of nodes N for use by a process are not available due to existence of a mixture of incompatible system software among nodes N, the parallel processing apparatus 100 gets, in advance, to know how many nodes N tend to be used at nodes N.

The parallel processing apparatus 100 sets the obtained number as the specific number indicating the preferable number of nodes N included per maintenance area, and generates maintenance area candidate list based on the specific number. As a result, in the parallel processing apparatus 100, once executing of a maintenance operation at nodes N included in a maintenance area is completed, it becomes possible to use as many nodes N as the specific number. This results in a reduction in the probability that a sufficient number of nodes N for use by a job are not available.

In FIG. 9, the parallel processing apparatus 100 acquires, from the schedule information, numbers of nodes N used by jobs in finished executions. The parallel processing apparatus 100 calculates the average value of the acquired numbers of nodes N and sets the calculated average value as the specific number indicating the preferable number of nodes N included in per maintenance area.

In the first embodiment, the parallel processing apparatus 100 obtains "6" as the average value of the acquired numbers of nodes N, and sets "6" as the specific number indicating the preferable number of nodes N included in per maintenance area. The parallel processing apparatus 100 stores, using the form DB, the set specific number indicating the preferable number of nodes N included in per maintenance area. The form DB is realized, for example, by a storage area such as the memory 302, the storage medium 305, or the like of the parallel processing apparatus 100 illustrated in FIG. 3.

As illustrated in FIG. 9, the form DB 900 includes fields for describing a number of computers (Hnum) and a length in X-coordinate (Hlen(X)). The form DB 900 sets information in each field thereby storing specific number information in a record.

In the number-of-computers field, the average number of nodes N used by jobs in the past. In the length in X-coordinate field, the specific number indicating the preferable number of nodes N included in per maintenance area, that is, the specific number represented by the vertical length of the maintenance area on the graph is set.

For example, the parallel processing apparatus 100 sets the average value of the numbers of nodes N used by jobs as the specific number indicating the preferable number of nodes N included in per maintenance area. For example, the parallel processing apparatus 100 may calculate a statistical value, other than the average value, of the numbers of nodes N used by jobs, and may employ the calculated statistical value as the specific number indicating the preferable number of nodes N included in per maintenance area. The statistical value may be, for example, a median, a mode, or the like.

For example, the parallel processing apparatus 100 sets the average value of the numbers of nodes N used by jobs as the specific number indicating the preferable number of nodes N included in per maintenance area. For example, instead of the average number of nodes N used by jobs, the parallel processing apparatus 100 may set a number of specified by a manager as the specific number indicating the preferable number of nodes N included in per maintenance area.

In FIG. 10, the parallel processing apparatus 100 generates a plurality of maintenance area candidate lists based on the node management DB 600 or the form DB 900. For example, the parallel processing apparatus 100 determines a coordinate Horg that is to be a start point of a first maintenance area. The parallel processing apparatus 100 sets, as the first maintenance area H(1), an area extending from the determined coordinate Horg of the start point of the maintenance area by a length equal to the set length in X-coordinate Hlen(X). Next, the parallel processing apparatus 100 sets a maintenance area H(2) located adjacent to the first maintenance area H(1) and extending along a length equal to the set the length in X-coordinate Hlen(X).

The parallel processing apparatus 100 sets other maintenance areas in a similar manner until all nodes N are included in maintenance areas, and generates a maintenance area candidate list HList(1) given by a combination of the set maintenance areas. In case where the number of nodes N realizing the parallel processing system 200 is not divisible by the specific number indicating the preferable number of nodes N included per one maintenance area, the parallel processing apparatus 100 sets remainder nodes N into one maintenance area.

Similarly, the parallel processing apparatus 100 generates maintenance area candidate lists HList(2) to HList(6) while shifting the coordinate Horg of the start point of the first maintenance area by one unit value at a time. An example of generation of a plurality of maintenance area candidate lists by the parallel processing apparatus 100 is realized by a maintenance area candidate list generation process described below with reference to FIG. 16.

The parallel processing apparatus 100 stores, using a maintenance area candidate list DB, the generated maintenance area candidate lists HList(1) to HList(6). The maintenance area candidate list DB is realized, for example, by a storage area such as the memory 302, the storage medium 305, or the like of the parallel processing apparatus 100 illustrated in FIG. 3.

As illustrated in FIG. 10, the maintenance area candidate list DB 1000 includes fields for describing a list name, a start X-coordinate of a maintenance area H(1), an end X-coordinate of the maintenance area H(1), a start X-coordinate of a maintenance area H(2), and an end X-coordinate of the maintenance area H(2). In the maintenance area candidate list DB 1000, information is set in each field thereby storing a maintenance area candidate list in a record.

In the list name field, a name identifying a maintenance area candidate list is set. In the field of the start X-coordinate of the maintenance area H(1), the X-coordinate of the start point of the maintenance area H(1) is set. In the field of the end X-coordinate of the maintenance area H(1), the X-coordinate of the end point of the maintenance area H(1) is set.

In the field of the start X-coordinate of the maintenance area H(2), the X-coordinate of the start point of the maintenance area H(2) is set. In the field of the end X-coordinate of the maintenance area H(2), the X-coordinate of the end point of the maintenance area H(2) is set.

Referring to FIG. 11, an example of selecting a maintenance area candidate list is described below. In FIG. 11, the parallel processing apparatus 100 selects, from a plurality of maintenance area candidate list, a maintenance area candidate list relatively preferable from the point of view of suppressing an adverse effect on the job execution schedule.

The parallel processing apparatus 100 identifies jobs execution schedule in a maintenance period from a maintenance start time to a maintenance end time based on the schedule DB 206, and selects a relatively preferable maintenance candidate list by comparing each of the maintenance area candidate lists.

In a case where a maintenance period includes a job execution schedule by a node N included in a maintenance area, executing a maintenance operation causes a change in the job execution schedule, which is likely to cause a delay to occur in a job execution start time from a scheduled execution start time. Therefore, it is preferable that the parallel processing apparatus 100 selects a maintenance area candidate list in which there is a relatively small overlap between the maintenance area and the node N where there is a job scheduled to be executed in the maintenance period.

For example, the parallel processing apparatus 100 compares a range from a maximum value to a minimum value of X-coordinates of the maintenance area in each maintenance area candidate list with a range from a maximum value to a minimum value of coordinates of one or more nodes N assigned to the job. The parallel processing apparatus 100 detects jobs scheduled to be executed at nodes N included in respective maintenance areas in the maintenance period based on a result of the comparison, and calculates numbers of jobs scheduled to be executed at nodes N included in the respective maintenance areas.

The parallel processing apparatus 100 stores, using a comparison result DB, the detected jobs and the calculated number of jobs. The comparison result DB is realized, for example, by a storage area such as the memory 302, the storage medium 305, or the like of the parallel processing apparatus 100 illustrated in FIG. 3.

As illustrated in FIG. 11, the comparison result DB 1100 includes fields for describing a list name, a job overlapping with maintenance in maintenance area H(1), a job overlapping with maintenance in maintenance area H(2), and the number of overlapping jobs. In the comparison result DB 1100, information is set in each field thereby storing the comparison result in a record.

In the list name field, a name identifying a maintenance area candidate list is set. In the field of the job overlapping with maintenance in maintenance area H(1), a name identifying a job to be executed at a node N included in the maintenance area H(1) is set. In the field of the job overlapping with maintenance in maintenance area H(2), a name identifying a job to be executed at a node N included in the maintenance area H(2) is set.

In field of the number of overlapping jobs, a value is set as to the sum of the number of jobs to be executed at nodes N included in the maintenance area H(1) and the number of jobs to be executed at nodes N included in the maintenance area H(2). The parallel processing apparatus 100 selects a maintenance area candidate list HList(1) which includes the smallest number of overlapping jobs.

An example of selecting a maintenance area candidate list by the parallel processing apparatus 100 is realized by a maintenance area candidate list selection process described below with reference to FIG. 17.

Figure 12:
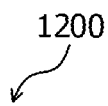
FIG. 12 is a diagram for use in illustrating the first embodiment.

Referring to FIG. 12, an example of generating a plurality of schedule candidates in each of which maintenance time zones are assigned is described below. In FIG. 12, the parallel processing apparatus 100 generates a plurality of schedule candidates in each of which non-overlapping continuous maintenance time zones are assigned to the maintenance area H(1) and the maintenance area H(2), respectively, in the selected maintenance area candidate list, and the parallel processing apparatus 100 calculates an evaluation value for each schedule candidate.

The parallel processing apparatus 100 generates a plurality of schedule candidates S(1) to S(8) in each of which maintenance time zones are assigned to the maintenance area H(1) and the maintenance area H(2), as illustrated in table 1200 in FIG. 12. Each column of the table 1200 in FIG. 12 indicates a start time of a maintenance time zone assigned to the maintenance area H(1). Each row of the table 1200 in FIG. 12 indicates a start time of a maintenance time zone assigned to the maintenance area H(2).

The parallel processing apparatus 100 calculates an evaluation value of each of the schedule candidates S(1) to S(8). The evaluation value increases by a value corresponding to a delay of a job execution start time from a scheduled execution start time which occurs when a maintenance operation is executed according to a schedule candidate. In a case where a delay in an execution start time of a first job causes a delay an execution start time of a second job from its scheduled execution start time, the evaluation value further increases by a value corresponding to the delay of the second job from its scheduled execution start time.

In the table 1200 in FIG. 12, a in "H(1):a" indicates a value that is to be added to the evaluation value in the maintenance area H(1). In the table 1200 in FIG. 12, b in "H(2):b" indicates a value that is to be added to the evaluation value in the maintenance area H(2). In the table 1200 in FIG. 12, "TOTAL" indicates the evaluation value. An example of generating a plurality of schedule candidates by the parallel processing apparatus 100 is realized by an evaluation value calculation process described below with reference to FIG. 18.

Figure 13:
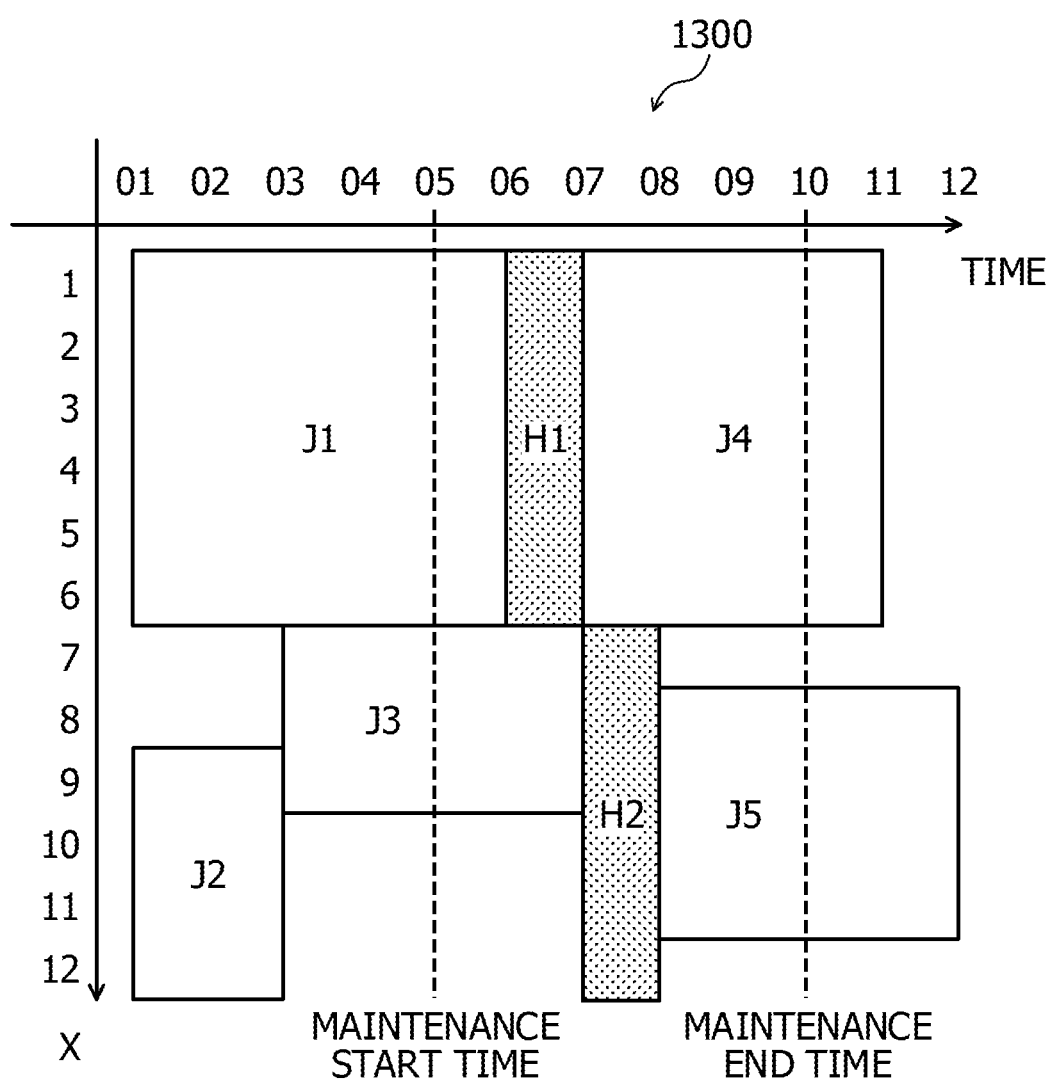
FIG. 13 is a diagram for use in illustrating the first embodiment.

Referring to FIG. 13, an example of changing execution schedules of jobs is described below. In FIG. 13, the parallel processing apparatus 100 selects a schedule candidate S(3) which has a lowest evaluation value. The parallel processing apparatus 100 sets a maintenance operation execution schedule according to the selected schedule candidate S(3) and changes the job execution schedule.

When the parallel processing apparatus 100 sets the execution schedule of the maintenance operation and changes the job execution schedule, then a result thereof is as illustrated in FIG. 13. More specifically, a graph 1300 in FIG. 13 illustrates maintenance operation execution schedules and execution schedules of a plurality of jobs at a plurality of nodes N. In the graph 1300 illustrated in FIG. 13, a vertical axis represents the coordinate of the node N. In the graph 1300 illustrated in FIG. 13, a horizontal axis represents time from 01 to 11.

In the graph 1300 in FIG. 13, each rectangle indicates which node N and which time zone are assigned to a maintenance operation or a job. In the graph 1300 in FIG. 13, the vertical length of each rectangle indicates the number of nodes N assigned to a maintenance operation or a job. In the graph 1300 in FIG. 13, the horizontal length of each rectangle indicates the length of a time zone assigned to a maintenance operation or a job.

The execution schedules of jobs J1, J2, and J3 in the example illustrated in FIG. 13 are similar to those illustrated in FIG. 5. As for a maintenance operation H1, an execution schedule is set such that nodes N1 to N6 and a time zone from time 06 to time 07 are assigned to the maintenance operation H1. As for a maintenance operation H2, an execution schedule is set such that nodes N7 to N12 and a time zone from time 07 to time 08 are assigned to the maintenance operation H2.

The maintenance operation H1 causes a delay of one unit time in the execution schedule of the job J4. Thus, the execution schedule of the job J4 is changed such that nodes N1 to N6 and a time zone from time 07 to time 11 are assigned. The maintenance operation H2 causes a delay of one unit time in the execution schedule of the job J5. Thus, the execution schedule of the job J5 is changed such that nodes N8 to N11 and a time zone from time 08 to time 12 are assigned.

FIG. 14 illustrates an example of a content stored in an execution schedule DB 1400 in which execution schedules of maintenance operations are stored. The parallel processing apparatus 100 stores, using the execution schedule DB 1400, the set execution schedules of maintenance operations. The execution schedule DB 1400 is realized, for example, by a storage area such as the memory 302, the storage medium 305, or the like of the parallel processing apparatus 100 illustrated in FIG. 3.

As illustrated in FIG. 14, the execution schedule DB 1400 includes fields for describing a maintenance area ID, a minimum X-coordinate, a maximum X-coordinate, a maintenance start time, and a maintenance end time. In the execution schedule DB 1400, information is set in each field for each maintenance area thereby storing execution schedule information in a record.

In each maintenance area ID, an ID identifying a maintenance area is set. In each minimum X-coordinate field, a minimum value of coordinates of one or more nodes N included in the maintenance area indicated by the maintenance area ID. In each maximum X-coordinate field, a maximum value of coordinates of the one or more nodes N included in the maintenance area indicated by the maintenance area ID.

In each maintenance start time field, a start time of a maintenance time zone assigned to the maintenance area indicated by maintenance area ID, that is, a start time, at which the execution of the maintenance operation of the maintenance area indicated by the maintenance area ID is to be started, is set. In each maintenance end time field, an end time of the maintenance time zone assigned to the maintenance area indicated by maintenance area ID, that is, an end time, at which the execution of the maintenance operation of the maintenance area indicated by the maintenance area ID is to be ended, is set.

Thus, the parallel processing apparatus 100 is capable of controlling maintenance operations and jobs such that a plurality of nodes N are divided into a plurality of maintenance areas and a maintenance operation is executed progressively from one maintenance area to another thereby making it easy to assign one or more nodes N to a process in an efficient manner while suppressing an adverse effect of maintenance operations at nodes N on the process scheduled to be executed at the nodes N.

For example, the parallel processing apparatus 100 is capable of generating a plurality of schedule candidates in which a plurality of nodes N are divided into a plurality of maintenance areas such that each maintenance area includes a minimized number of nodes N at which there is a job scheduled to be executed in a maintenance period. For example, the parallel processing apparatus 100 generates a plurality of schedule candidates by selecting, from a plurality of maintenance area candidate lists, maintenance area candidate lists in which there are a minimum number of nodes N at which a job is scheduled to be executed in a maintenance period.

Thus, the parallel processing apparatus 100 is capable of generating a plurality of schedule candidates that are relatively preferable from the point of view of suppressing an adverse effect on job execution schedules. Thus, the parallel processing apparatus 100 is capable of reducing the number of schedule candidates to be subjected to the evaluation, and reducing an amount of processing in the evaluation.

For example, the parallel processing apparatus 100 generates a plurality of schedule candidates such that a plurality of nodes N are divided into a plurality of maintenance areas such that at least one maintenance area includes as many nodes N as a number equal to or greater than the specific number. For example, the parallel processing apparatus 100 generates a maintenance area candidate list such that at least one of the maintenance areas includes as many nodes N as a specific number indicating a preferable number of included nodes per one maintenance area.

As a result, in the parallel processing apparatus 100, when the maintenance operation is executed simultaneously for all of the specific number of nodes N in the one of the maintenance areas including the specific number of nodes N, then after the maintenance operation is completed, it becomes possible to use as many nodes N as the specific number. This makes it possible, in the parallel processing apparatus 100, to reduce the probability that when a job that uses as many node Ns as the specific number occurs, the number of nodes N available to be assigned to the job is smaller than the specific number.

For example, the parallel processing apparatus 100 is capable of setting, based on the average number of nodes N used in jobs in the past, a specific number indicating a preferable number of nodes N included in at least one of maintenance areas. Thus, the parallel processing apparatus 100 automatically sets a proper value as the specific number indicating a preferable number of nodes N included in one of maintenance areas based on the average number of nodes N used in jobs in the past. Therefore, the parallel processing apparatus 100 reduces a load on a manager.

The parallel processing apparatus 100 may generate a plurality of schedule candidates such that a plurality of nodes N are divided into a plurality of maintenance areas such that at least one maintenance area includes two or more nodes N that are connected continuously. For example, the parallel processing apparatus 100 generates a maintenance area candidate list such that at least one maintenance area includes two or more nodes N that are connected continuously.

Thus, in the parallel processing apparatus 100, in one of maintenance areas including one or more continuously connected nodes N, if the maintenance operation is executed simultaneously for all of the two or more continuously connected nodes N, then after the maintenance operation is completed, it becomes possible to use the two or more continuously connected nodes N. Therefore, the parallel processing apparatus 100 is capable of handling a case in which a job uses one or more nodes N disposed in the form of a submesh or a subtorus, and thus it becomes possible to suppress interference with communication in other jobs.

The parallel processing apparatus 100 is capable of adjusting schedules of executing jobs by a plurality of nodes N based on one of the schedule candidates. As a result, the parallel processing apparatus 100 is capable of re-assigning one or more nodes N to jobs in an efficient manner while suppressing an adverse effect of the maintenance operation at the nodes N on the jobs scheduled to be executed by the nodes N. The parallel processing apparatus 100 is capable of controlling the execution of jobs such that a job requested to be executed by a user is not executed by a node N when the node N is being subjected to a maintenance operation.

Therefore, the parallel processing apparatus 100 is capable of reducing the probability that either the maintenance operation or the process requested to be executed by the user falls in an unstable state.

The parallel processing apparatus 100 is capable of generating a plurality of schedule candidates such that maintenance time zones each having a length of time corresponding to a maintenance time are continuously allocated in a scheduled maintenance period and the maintenance time zones are assigned to respective maintenance areas such that no overlap occurs among the maintenance areas. As a result, in the parallel processing apparatus 100, it becomes possible to execute a maintenance operation progressively such that a situation hardly occurs in which the system software is not compatible among the nodes N.

Figure 15:
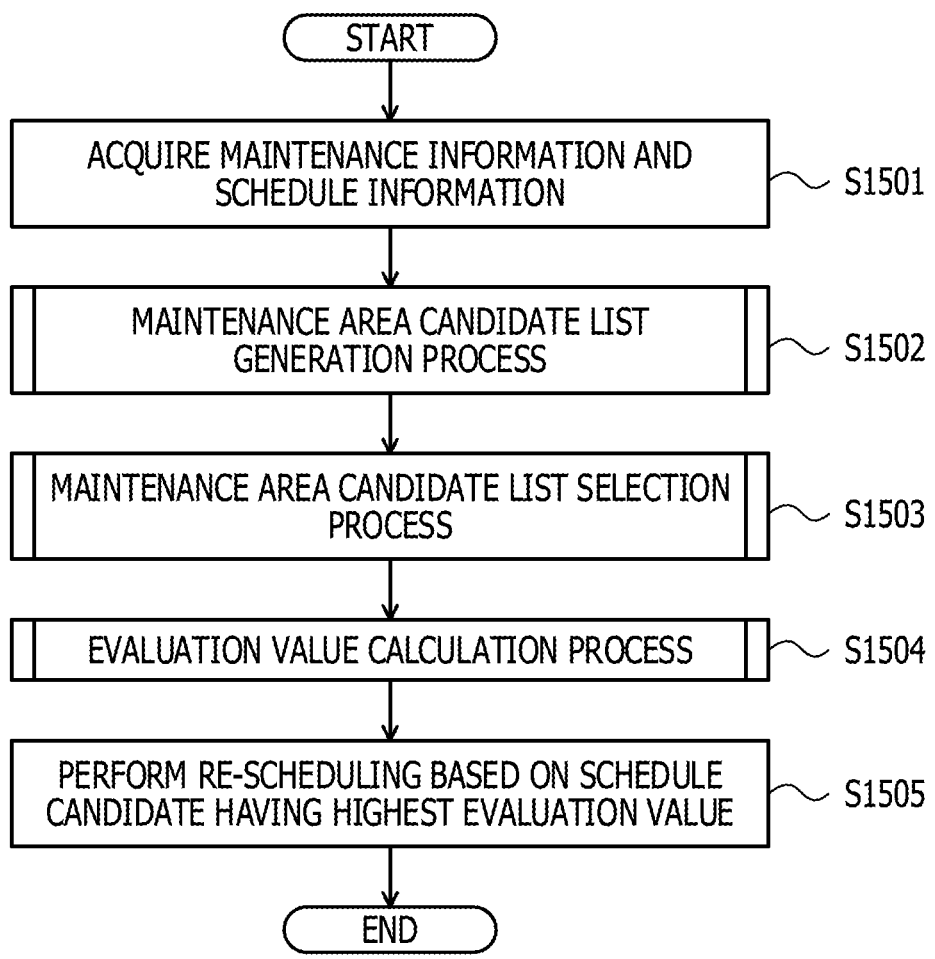
FIG. 15 is a diagram illustrating an example of a maintenance process.

FIG. 15 is a diagram illustrating an example of a maintenance process. In FIG. 15, the parallel processing apparatus 100 acquires maintenance information including a maintenance start time and a maintenance end time and schedule information including a job execution schedule (step S1501).

The parallel processing apparatus 100 executes a maintenance area candidate list generation process based on maintenance information as will be described later with reference to FIG. 16 (step S1502). The parallel processing apparatus 100 executes a maintenance area candidate selection process based on schedule information as will be described later with reference to FIG. 17 (step S1503).

The parallel processing apparatus 100 executes an evaluation value calculation process as will be described later with reference to FIG. 18, thereby calculating an evaluation value of each schedule candidate of the plurality of schedule candidates (step S1504). The parallel processing apparatus 100 performs re-scheduling based on a schedule candidate having a lowest evaluation value (step S1505).

Thereafter, the parallel processing apparatus 100 ends the maintenance process. Thus, the parallel processing apparatus 100 is capable of controlling maintenance operations and jobs such that a plurality of nodes N are divided into a plurality of maintenance areas and a maintenance operation is executed progressively from one maintenance area to another, and one or more nodes N are assigned to jobs in an efficient manner while suppressing an adverse effect of the maintenance operation at the nodes N on the jobs scheduled to be executed by the nodes N.

Figure 16:
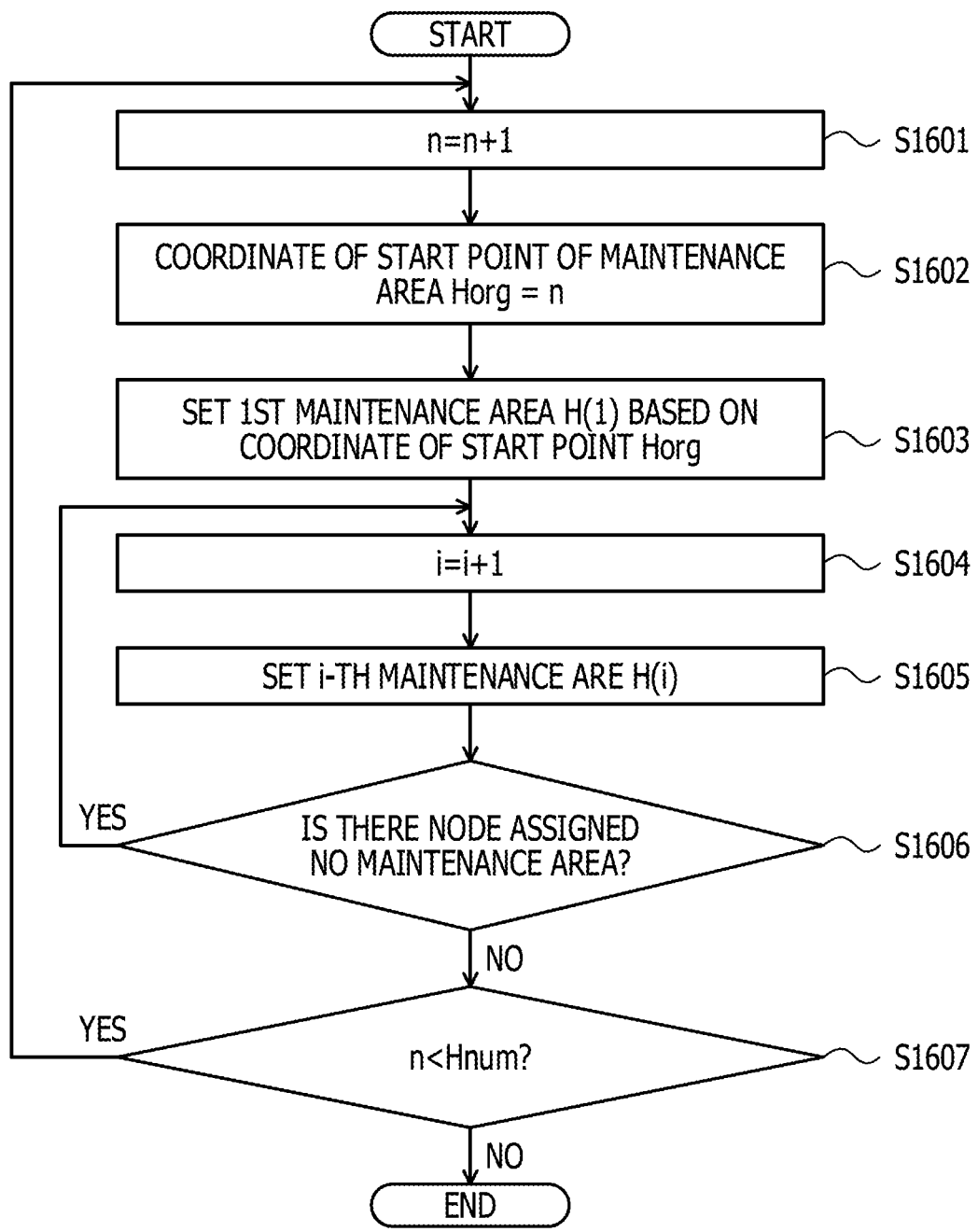
FIG. 16 illustrates an example of a maintenance area candidate list generation process.

FIG. 16 illustrates an example of a maintenance area candidate list generation process. In FIG. 16, the parallel processing apparatus 100 initializes n and i such that n=0 and i=1. The parallel processing apparatus 100 sets n such that n=n+1 (step S1601).

The parallel processing apparatus 100 sets a coordinate Horg of a start point of a maintenance area such that Horg=n (step S1602). The parallel processing apparatus 100 sets a first maintenance area H(1) based on the coordinate Horg indicating the start point (step S1603). The parallel processing apparatus 100 sets i such that i=i+1 (step S1604). The parallel processing apparatus 100 then sets an i-th maintenance area H(i) (step S1605).

The parallel processing apparatus 100 determines whether there is a node N assigned no maintenance area (step S1606). In a case where there is a node N assigned no maintenance area (step S1606: Yes), the parallel processing apparatus 100 returns to the process in step S1604.

In a case where there is no node N assigned no maintenance area (step S1606: No), the parallel processing apparatus 100 determines whether n<Hnum (step S1607). In a case where n<Hnum (step S1607: Yes), the parallel processing apparatus 100 returns to the process in step S1601.

In a case where condition n<Hnum is not satisfied (step S1607: No), the parallel processing apparatus 100 ends the maintenance area candidate list generation process. Thus, the parallel processing apparatus 100 generates a plurality of maintenance area candidate lists and generates a population for use in selecting a preferable maintenance area candidate list in a maintenance area candidate selection process described below with reference to FIG. 17.

Figure 17:
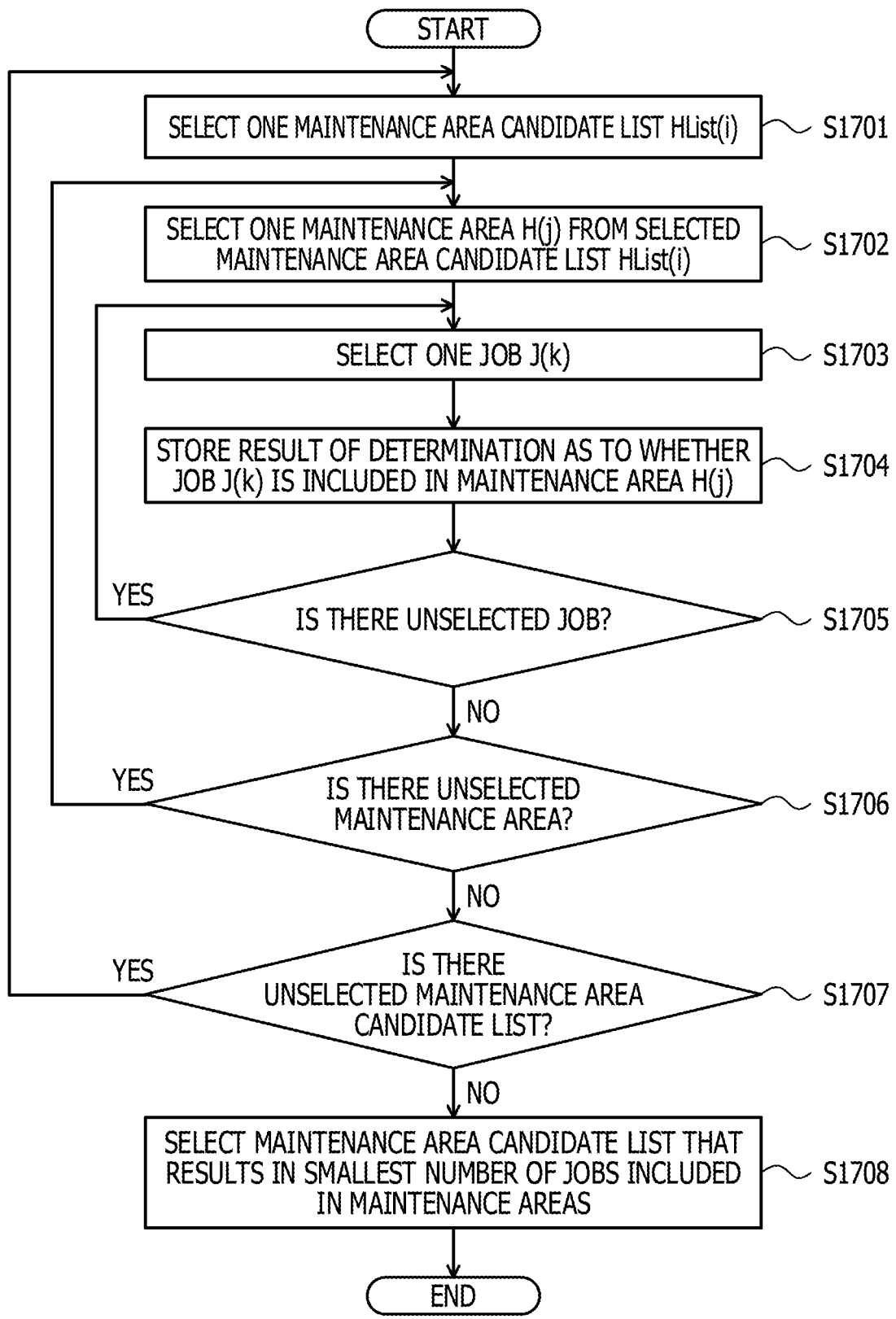
FIG. 17 illustrates an example of a maintenance area candidate selection process.

FIG. 17 illustrates an example of a maintenance area candidate selection process. In FIG. 17, the parallel processing apparatus 100 selects one maintenance area candidate list HList(i) (step S1701).

The parallel processing apparatus 100 select one maintenance area H(j) from the selected maintenance area candidate list HList (i) (step S1702). The parallel processing apparatus 100 selects one job J(k) (step S1703).

The parallel processing apparatus 100 makes a comparison between a range from a maximum value to a minimum value of the selected maintenance area H(j) and a range from a maximum value to a minimum value of the selected job J(k). The parallel processing apparatus 100 stores a result of a confirmation made based on the result of the comparison as to whether the maintenance area H(j) includes the job J(k) (step S1704).

The parallel processing apparatus 100 determines whether there is an unselected job (step S1705). In a case where there is an unselected job (step S1705: Yes), the parallel processing apparatus 100 returns to the process in step S1703.

In a case where all jobs have been selected (step S1705: No), the parallel processing apparatus 100 determines whether there is an unselected maintenance area (step S1706). In a case where there is an unselected maintenance area (step S1706: Yes), the parallel processing apparatus 100 returns to the process in step S1702.

In a case where all maintenance areas have been selected (step S1706: No), the parallel processing apparatus 100 determines whether there is an unselected maintenance area candidate list (step S1707). In a case where there is an unselected maintenance area candidate list (step S1707: Yes), the parallel processing apparatus 100 returns to the process in step S1701.

In a case where all maintenance area candidate lists have been selected (step S1707: No), the parallel processing apparatus 100 proceeds to a process in step S1708.

In step S1708, based on the numbers of jobs included in maintenance areas in the respective maintenance area candidate lists, the parallel processing apparatus 100 selects a maintenance area candidate list in which there are a minimum number of jobs in a maintenance area (step S1708).

The parallel processing apparatus 100 ends the maintenance area candidate selection process. Thus, the parallel processing apparatus 100 is capable of selecting a maintenance area candidate list relatively preferable from the point of view of suppressing an adverse effect on the job execution schedule, and it is possible to reduce an amount of processing in an evaluation value calculation process described below with referent to FIG. 18.

Figure 18:
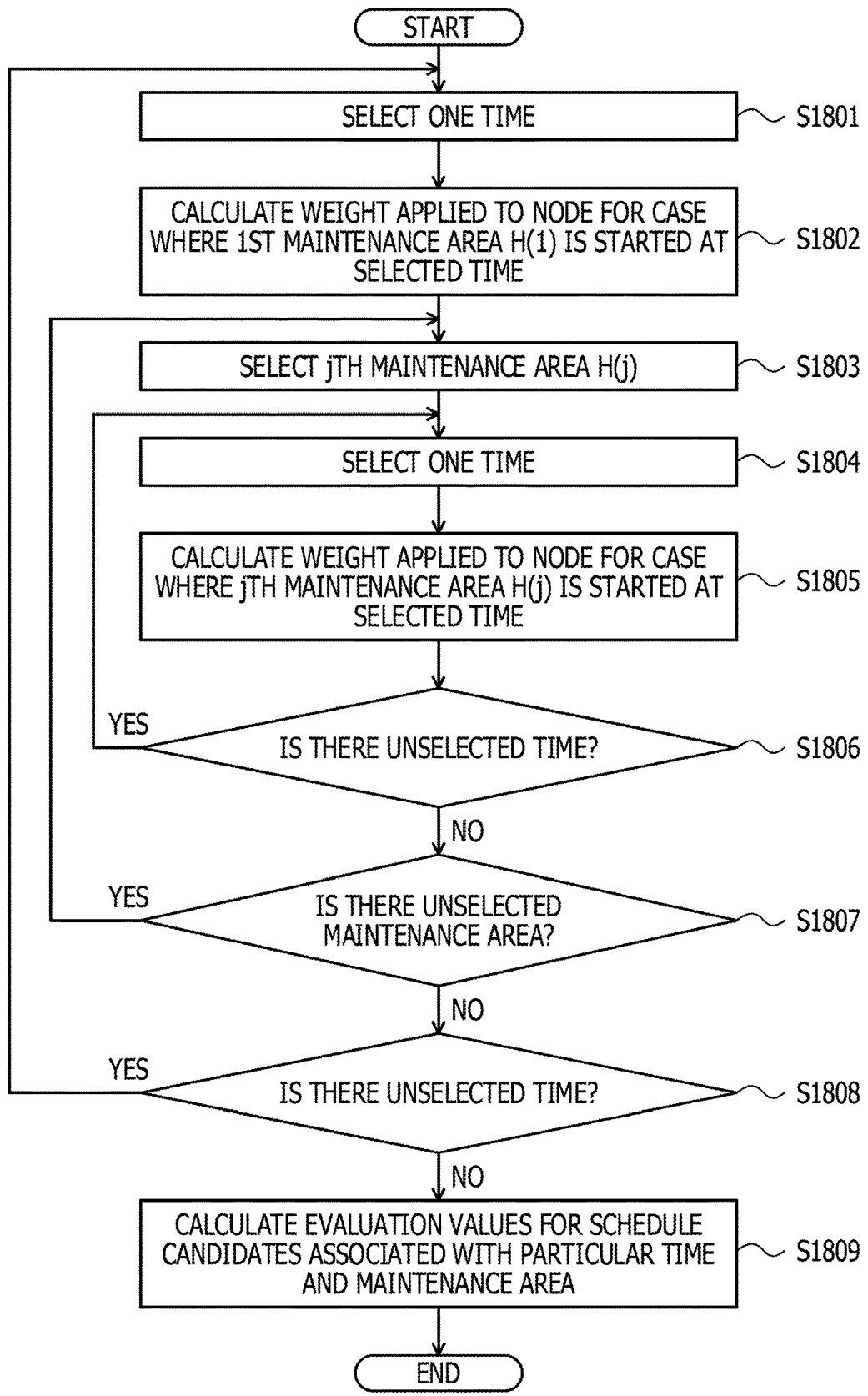
FIG. 18 illustrates an example of an evaluation value calculation process.

FIG. 18 illustrates an example of an evaluation value calculation process. In FIG. 18, the parallel processing apparatus 100 select a time in a scheduled maintenance period from a maintenance start time to a maintenance end time (step S1801). The parallel processing apparatus 100 calculates a weight that is to be applied to a node N in a case where a first maintenance area H(1) is started at the selected time (step S1802).

The parallel processing apparatus 100 selects a j-th maintenance area H(j) from second and following maintenance areas (step S1803). The parallel processing apparatus 100 select a time in a scheduled maintenance period from a maintenance start time to a maintenance end time (step S1804).

The parallel processing apparatus 100 calculates a weight that is to be applied to a node N in a case where the j-th maintenance area H(j) is started at the selected time (step S1805). The parallel processing apparatus 100 determines whether there is an unselected time for the j-th maintenance area H(j) (step S1806). In a case where there is an unselected time (step S1806: Yes), the parallel processing apparatus 100 returns to the process in step S1804.

In a case where all times have been selected (step S1806: No), the parallel processing apparatus 100 determines whether there is an unselected maintenance area (step S1807). In a case where there is an unselected maintenance area (step S1807: Yes), the parallel processing apparatus 100 returns to the process in step S1803.

In a case where all maintenance areas have been selected (step S1807: No), the parallel processing apparatus 100 determines whether there is an unselected time for the first maintenance area H(1) (step S1808). In a case where there is an unselected time (step S1808: Yes), the parallel processing apparatus 100 returns to the process in step S1801.

In a case where all times have been selected (step S1808: No), the parallel processing apparatus 100 calculates an evaluation value of a schedule candidate related to a time and a maintenance area based on the calculated weight of the node N (step S1809).

The parallel processing apparatus 100 ends the evaluation value calculation process. Thus, the parallel processing apparatus 100 is capable of calculating evaluation values for use as indexes in determining which schedule candidate is preferable from the point of view of suppressing an adverse effect on the job execution schedule.

Referring to FIGS. 19 to 25, a second embodiment is described below. In the first embodiment described above, the number of nodes N realizing the parallel processing system 200 is divisible by a specific number indicating the number of nodes N that are preferable to be included in a group. In the second embodiment, the number of nodes N realizing the parallel processing system 200 is not divisible by a specific number indicating the number of nodes N that are preferable to be included in a group, and a remainder occurs.

In the second embodiment, as with the first embodiment, the parallel processing system 200 includes twelve nodes N. The twelve nodes N are connected in the form of a one-dimensional torus. Each node N is assigned a coordinate X. As in the first embodiment, it is assumed by way of example that the maintenance start time is 05 and the maintenance end time is 10. The time is divided into intervals with a length of, for example, one hour. As with the first embodiment, it is assumed by way of example that the maintenance time has a length of one unit time.

In the second embodiment, as with the first embodiment, it is assumed by way of example that there are execution schedules of jobs 31 to 35 as illustrated in FIG. 5. As in the first embodiment, the parallel processing apparatus 100 stores coordinates of the nodes N using the node management DB 600 illustrated in FIG. 6. As in the first embodiment, the parallel processing apparatus 100 stores a plurality of job execution schedules using the execution schedule DB 700 illustrated in FIG. 7. As in the first embodiment, the parallel processing apparatus 100 stores maintenance information using the maintenance information DB 800 illustrated in FIG. 8.

Referring to FIGS. 19 and 20, an example of generation of a maintenance area candidate list is described below. In FIGS. 19 and 20, to makes it easy to reduce the probability that a sufficient number of nodes N for use by a process are not available due to existence of a mixture of incompatible system software among nodes N, the parallel processing apparatus 100 gets, in advance, to know how many nodes N tend to be used at nodes N.

The parallel processing apparatus 100 sets the detected number as the specific number indicating a preferable number of nodes N to be included per one maintenance area, and generates a maintenance area candidate list. As a result, in the parallel processing apparatus 100, once executing of a maintenance operation at nodes N included in a maintenance area is completed, it becomes possible to use as many nodes N as the specific number. This results in a reduction in the probability that a sufficient number of nodes N for use by a job are not available.

In FIG. 19, the parallel processing apparatus 100 acquires, from the schedule information, numbers of nodes N used by jobs in finished executions. The parallel processing apparatus 100 calculates the average value of the acquired numbers of nodes N and sets the calculated average value as the specific number indicating the preferable number of nodes N included in per maintenance area.

In the second embodiment, the parallel processing apparatus 100 obtains "5" as the average value of the acquired numbers of nodes N, and sets "5" as the specific number indicating the preferable number of nodes N included in per maintenance area. The parallel processing apparatus 100 stores, using the form DB 1900, the set specific number indicating the preferable number of nodes N included in per maintenance area. The form DB 1900 may be similar to the form DB 900 illustrated in FIG. 9.

For example, the parallel processing apparatus 100 sets the average value of nodes N used by jobs as the specific number indicating the preferable number of nodes N included in per maintenance area. For example, the parallel processing apparatus 100 may calculate a statistical value, other than the average value, of the numbers of nodes N used by jobs, and may employ the calculated statistical value as the specific number indicating the preferable number of nodes N included in per maintenance area. The statistical value is, for example, a median, a mode, or the like.

For example, the parallel processing apparatus 100 sets the average value of the numbers of nodes N used by jobs as the specific number indicating the preferable number of nodes N included in per maintenance area. For example, the parallel processing apparatus 100 may set, instead of the average value of the numbers of nodes N used by jobs, a number specified by a manager as the specific number indicating the preferable number of nodes N included in per maintenance area.

In FIG. 20, the parallel processing apparatus 100 generates a plurality of maintenance area candidate lists based on the node management DB 600 or the form DB 1900. The number of nodes N realizing the parallel processing system 200 is not divisible by a specific number indicating the number of nodes N that are preferable to be included in a group, and thus, the parallel processing apparatus 100 generates a maintenance area candidate list including three maintenance areas which area different in length from each other.

As in the first embodiment, the parallel processing apparatus 100 generates maintenance area candidate lists HList(1) to HList(12). The parallel processing apparatus 100 stores, using the maintenance area candidate list DB 2000, the generated maintenance area candidate lists HList(1) to HList(12). The maintenance area candidate list DB 2000 may be similar to the maintenance area candidate list DB 1000 illustrated in FIG. 10.

Referring to FIG. 21, an example of a selection of a maintenance area candidate list is described below. In FIG. 21, the parallel processing apparatus 100 selects, from a plurality of maintenance area candidate list, a maintenance area candidate list relatively preferable from the point of view of suppressing an adverse effect on the job execution schedule.

As in the first embodiment, the parallel processing apparatus 100 detects jobs scheduled to be executed at nodes N included in respective maintenance areas in maintenance periods, and calculates numbers of jobs scheduled to be executed at nodes N included in the respective maintenance areas. The parallel processing apparatus 100 stores, using a comparison result DB 2100, the detected jobs and the calculated number of jobs. The comparison result DB 2100 may be similar to the comparison result DB 1100 illustrated in FIG. 11.

In FIG. 22, the parallel processing apparatus 100 selects a maintenance area candidate list HList(2) and a maintenance area candidate list HList(7) between which a minimum number of jobs overlap, and stores a selection result 2200. The parallel processing apparatus 100 may select either one of the maintenance area candidate list HList(2) and the maintenance area candidate list HList(7). Here let it be assume by way of example that the maintenance area candidate list HList(2) is selected by the parallel processing apparatus 100.

Referring to FIG. 23, an example of assigning a maintenance time zone and generating a plurality of schedule candidates is described below. In FIG. 23, the parallel processing apparatus 100 generates a plurality of schedule candidates in each of which non-overlapping continuous maintenance time zones are assigned to the maintenance area H(1), the maintenance area H(2), and the maintenance area H(3), respectively, in the selected maintenance area candidate list, and the parallel processing apparatus 100 calculates an evaluation value for each schedule candidate.

For example, the parallel processing apparatus 100 generates a plurality of schedule candidates S(1) to S(18) such that maintenance time zones are respectively assigned to the maintenance area H(1), the maintenance area H(2), and the maintenance area H(3) as illustrated in table 2300 in FIG. 23. The parallel processing apparatus 100 calculates an evaluation value of each of the schedule candidates S(1) to S(18). In the table 2300 in FIG. 23, in a field of "weight", a weight corresponding to a length of a delay in a job execution start time from a scheduled execution start time and an evaluation value are described.

Figure 24:
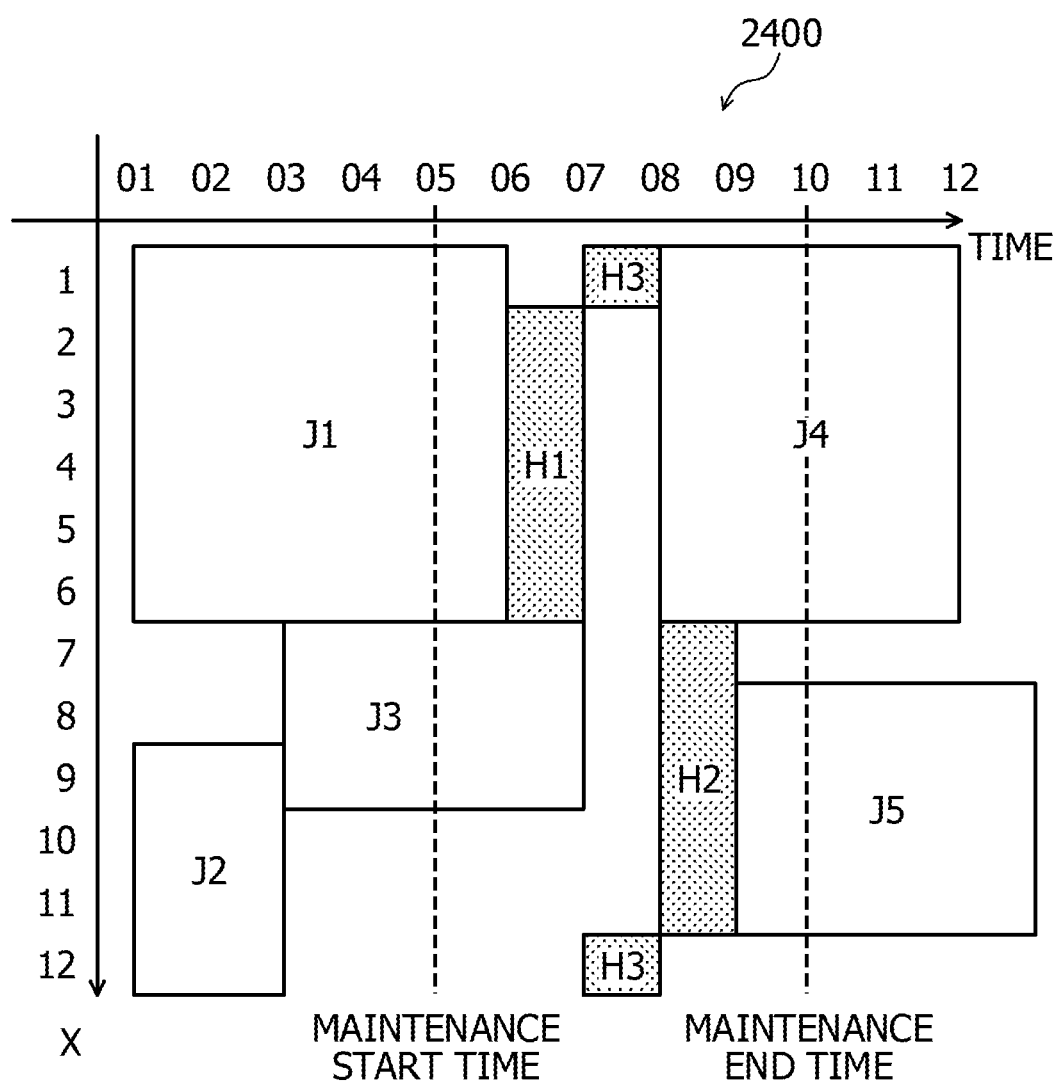
FIG. 24 is a diagram for use in illustrating the second embodiment.

Referring to FIG. 24, an example of changing execution schedules of jobs is described below. In FIG. 24, the parallel processing apparatus 100 selects either one of the schedule candidate S(8) and the schedule candidate S(10) each having a smallest evaluation value. Here let it be assumed by way of example that the parallel processing apparatus 100 selects the schedule candidate S(8) as a schedule candidate having the smallest evaluation value. The parallel processing apparatus 100 then sets a maintenance operation execution schedule according to the selected schedule candidate S(8), and changes the job execution schedule.

When the parallel processing apparatus 100 sets the execution schedule of the maintenance operation and changes the job execution schedule, then a result thereof is as illustrated in FIG. 24. More specifically, a graph 2400 in FIG. 24 illustrates a maintenance operation execution schedule and an execution schedule of a plurality of jobs at a plurality of nodes N. In the graph 2400 illustrated in FIG. 24, a vertical axis represents the coordinate of the node N. In the graph 2400 illustrated in FIG. 24, a horizontal axis represents time from 01 to 11.

In the graph 2400 in FIG. 24, each rectangle indicates which node N and which time zone are assigned to a maintenance operation or a job. In the graph 2400 in FIG. 24, the vertical length of each rectangle indicates the number of nodes N assigned to a maintenance operation or a job. In the graph 2400 in FIG. 24, the horizontal length of each rectangle indicates the length of a time zone assigned to a maintenance operation or a job.

The execution schedules of jobs 31, 32, and 33 in the example illustrated in FIG. 24 are similar to those illustrated in FIG. 5. As for a maintenance operation H1, an execution schedule is set such that nodes N2 to N6 and a time zone from time 06 to time 07 are assigned to the maintenance operation H1. As for a maintenance operation H2, an execution schedule is set such that nodes N7 to N11 and a time zone from time 08 time 09 are assigned to the maintenance operation H2. As for a maintenance operation H3, an execution schedule is set such that nodes N1 and N12 and a time zone from time 07 to time 08 are assigned to the maintenance operation H3.

A delay of two unit times in the execution schedule of the job J4 occurs due to the maintenance operations H1 and H3. Thus, the execution schedule of the job J4 is changed such that nodes N1 to N6 and a time zone from time 08 to time 12 are assigned. A delay of two unit times in the execution schedule of the job J5 occurs due to the maintenance operations H2 and H3. Thus, the execution schedule of the job J5 is changed such that nodes N8 to N11 and a time zone from time 09 to time 13 are assigned.

The parallel processing apparatus 100 stores the set execution schedules of maintenance operations using an execution schedule DB 2500 as illustrated in FIG. 25. The execution schedule DB 2500 may be similar to the execution schedule DB 1400 illustrated in FIG. 14.

Thus, the parallel processing apparatus 100 is capable of controlling maintenance operations and jobs such that a plurality of nodes N are divided into a plurality of maintenance areas and a maintenance operation is executed progressively thereby making it easy to assign one or more nodes N to a process in an efficient manner while suppressing an adverse effect of maintenance operations at nodes N on the process scheduled to be executed at the nodes N.

For example, the parallel processing apparatus 100 is capable of generating a plurality of schedule candidates in which a plurality of nodes N are divided into a plurality of maintenance areas such that each maintenance area includes a minimized number of nodes N at which there is a process scheduled to be executed in a maintenance period. More specifically, for example, the parallel processing apparatus 100 generates a plurality of schedule candidates by selecting, from a plurality of maintenance area candidate lists, maintenance area candidate lists in which there are a minimum number of nodes N at which a job is scheduled to be executed in a maintenance period.

Thus the parallel processing apparatus 100 is capable of generating a plurality of schedule candidates that are relatively preferable from the point of view of suppressing an adverse effect on the job execution schedule. Therefore, in the parallel processing apparatus 100, is capable of reducing the number of schedule candidates to be subjected to the evaluation, and reducing an amount of processing in the evaluation.

For example, the parallel processing apparatus 100 is capable of generating a plurality of schedule candidates such that a plurality of nodes N are divided into a plurality of maintenance area such that at least one maintenance area includes as many nodes N as a number equal to or greater than the specific number. For example, the parallel processing apparatus 100 is capable of generating a maintenance area candidate list such that at least one of the maintenance areas includes as many nodes N as a specific number indicating a preferable number of included nodes per maintenance area.

Thus, in the parallel processing apparatus 100, when the maintenance operation is executed simultaneously for all of the specific number of nodes N in the one of the maintenance areas including the specific number of nodes N, then after the completion of the maintenance operation, it becomes possible to use as many nodes N as the specific number. This makes it possible, in the parallel processing apparatus 100, to reduce the probability that when a job that uses as many node Ns as the specific number occurs, the number of nodes N available to be assigned to the job is smaller than the specific number.

For example, the parallel processing apparatus 100 is capable of setting, based on the average number of nodes N used in processes in the past, a specific number indicating a preferable number of nodes N included in at least one of maintenance areas. Thus, the parallel processing apparatus 100 automatically sets a proper value as the specific number indicating a preferable number of nodes N included in one of maintenance areas based on the average number of nodes N used in jobs in the past. Therefore, the parallel processing apparatus 100 is capable of reducing a load on a manager.

The parallel processing apparatus 100 may generate a plurality of schedule candidates such that a plurality of nodes N are divided into a plurality of maintenance areas such that at least one maintenance area includes two or more nodes N that are connected continuously. For example, the parallel processing apparatus 100 is capable of generating a maintenance area candidate list such that at least one maintenance area includes two or more nodes N that are connected continuously.

Thus, in the parallel processing apparatus 100, in one of maintenance areas including one or more continuously connected nodes N, if the maintenance operation is executed simultaneously for all of the two or more continuously connected nodes N, then after the maintenance operation is completed, it becomes possible to use the two or more continuously connected nodes N. Thus, the parallel processing apparatus 100 is capable of handling a case in which a job uses one or more nodes N disposed in the form of a submesh or a subtorus, and thus it becomes possible to suppress interference with communication in other jobs.

The parallel processing apparatus 100, is capable of adjusting schedules of executing jobs by a plurality of nodes N based on one of the schedule candidates. Thus, the parallel processing apparatus 100 is capable of re-assigning one or more nodes N to jobs in an efficient manner while suppressing an adverse effect of the maintenance operation at the nodes N on the jobs scheduled to be executed at the nodes N. The parallel processing apparatus 100, is capable of controlling the execution of jobs such that a job requested to be executed by a user is not executed by a node N when the node N is being subjected to a maintenance operation. Thus, the parallel processing apparatus 100 is capable of reducing the probability that either the maintenance operation or the process requested to be executed by the user falls in an unstable state.

The parallel processing apparatus 100 is capable of generating a plurality of schedule candidates such that maintenance time zones each having a length of time corresponding to a maintenance time are continuously allocated in a scheduled maintenance period and the maintenance time zones are assigned to respective maintenance areas such that no overlap occurs among the maintenance areas. Thus, the parallel processing apparatus 100 is capable of executing the maintenance operation progressively such that a situation hardly occurs in which the system software is not compatible among the nodes N.

The maintenance process according to the second embodiment may be similar to the maintenance process illustrated in FIG. 15.

An example of a maintenance area candidate list generation process according to the second embodiment may be similar to the maintenance area candidate list generation process described above with reference to FIG. 16.

An example of a maintenance area candidate selection process according to the second embodiment may be similar to the maintenance area candidate selection process described above with reference to FIG. 17.

An example of an evaluation value calculation process according to the second embodiment may be similar to the evaluation value calculation process described above with reference to FIG. 18.

As described above, the parallel processing apparatus 100 evaluates, based on process execution schedule at nodes N in a maintenance period, a plurality of schedule candidates each generated such that a plurality of nodes N are divided into a plurality of maintenance areas and maintenance time zones are respectively assigned, in the maintenance period, to the maintenance areas without overlap among the maintenance areas. The parallel processing apparatus 100 outputs one schedule candidate of the plurality of schedule candidates based on a result of the evaluation. Thus, the parallel processing apparatus 100 is capable of controlling maintenance operations and jobs such that a plurality of nodes N are divided into a plurality of maintenance areas and a maintenance operation is executed progressively thereby making it easy to assign one or more nodes N to a process in an efficient manner while suppressing an adverse effect of maintenance operations at nodes N on the process scheduled to be executed at the nodes N.

The parallel processing apparatus 100 generates a plurality of schedule candidates in which a plurality of nodes N are divided into a plurality of maintenance areas such that each maintenance area includes a minimized number of nodes N at which there is a process scheduled to be executed in a maintenance period. Thus, the parallel processing apparatus 100 is capable of generating a plurality of schedule candidates that are relatively preferable from the point of view of suppressing an adverse effect on the process execution schedule. Thus, the parallel processing apparatus 100 reduces the number of schedule candidates subjected to the evaluation thereby achieving a reduction in the amount of processing in the evaluation.

The parallel processing apparatus 100 generates a plurality of schedule candidates such that a plurality of nodes N are divided into a plurality of maintenance areas such that at least one maintenance area includes as many nodes N as a number equal to or greater than the specific number. Thus, in the parallel processing apparatus 100, once executing of a maintenance operation at nodes N included in one maintenance area is completed, it becomes possible to user as many nodes N as the specific number. This results in a reduction in the probability that a sufficient number of nodes N for use by a process are not available.

The parallel processing apparatus 100 is capable of setting, based on the average number of nodes N used in processes in the past, a specific number indicating a preferable number of nodes N included in one of maintenance areas. Thus, the parallel processing apparatus 100 is capable of automatically setting a proper value as the specific number indicating a preferable number of nodes N included in one of maintenance areas based on the average number of nodes N used in processes in the past.

The parallel processing apparatus 100 generates a plurality of schedule candidates in which a plurality of nodes N are divided into a plurality of maintenance areas such maintenance areas each include two or more nodes N that are connected continuously. Thus, in the parallel processing apparatus 100, once executing of a maintenance operation at nodes N included in one of groups is completed, it becomes possible to use the two or more continuously connected nodes N. Therefore, the parallel processing apparatus 100 is capable of handling a case in which a process uses one or more nodes N disposed in the form of a submesh or a subtorus, and thus it becomes possible to suppress interference with communication in other processes.

The parallel processing apparatus 100 is capable of changing a process execution schedule of a node N in a maintenance period based on one of schedule candidates. Thus, the parallel processing apparatus 100 is capable of re-assigning one or more nodes N to processing a process in an efficient manner while suppressing an adverse effect of the maintenance operation at the nodes N on the process scheduled to be executed by the nodes N.

The parallel processing apparatus 100 is capable of generating a plurality of schedule candidates such that maintenance time zones each having a length of time corresponding to a maintenance time are continuously allocated in a scheduled maintenance period and the maintenance time zones are assigned to respective maintenance areas such that no overlap occurs among the maintenance areas. Thus, the parallel processing apparatus 100 is capable of executing the maintenance operation progressively such that a situation hardly occurs in which the system software is not compatible among the nodes N.

The above-described method of performing maintenance on the parallel processing apparatus can be realized by executing a program prepared in advance by a computer such as a personal computer, a workstation, or the like. A parallel processing program is stored in a computer-readable storage medium such as a hard disk, a flexible disk, a CD-ROM disk, a MO disk, a DVD disk, or the like, and the parallel processing program is read out from the storage medium and executed by a computer. The parallel processing program may be supplied via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel processing apparatus comprising:
a memory; and
a processor coupled to the memory, the processor is configured to:
acquire a first time and a second time;
generate a plurality of combinations each including a plurality of groups, each of the plurality of groups including a specific number of nodes which are included in a plurality of nodes and are different from the specific number of nodes of another group of the plurality of groups;
acquire, for each of the plurality of combinations, a number of jobs which are to be executed by the nodes of the specific number of each of the groups as a maintenance operation for each of the plurality of nodes in a time period from the first time to the second time;
calculate, for each of the plurality of combinations, a sum of the number of jobs for each of the groups;
select a combination having a smallest sum of the number of the jobs;
generate a plurality of schedule candidates by assigning a different time zone, which is between the first time and the second time, to each of the groups of the selected combination;
evaluate the plurality of schedule candidates based on one or more process execution schedules of one or more nodes of the groups of the selected combination; and
output one schedule candidate of the plurality of schedule candidates based on a result of the evaluation.

2. The parallel processing apparatus according to claim 1, wherein the specific number is set based on an average number of nodes used in processes in the maintenance operation in the past.

3. The parallel processing apparatus according to claim 1, wherein the nodes of the specific number are successively coupled.

4. The parallel processing apparatus according to claim 1, wherein the processor changes the one or more process execution schedules of the one or more nodes based on at least one of the schedule candidates.

5. The parallel processing apparatus according to claim 1, wherein the processor generates the plurality of schedule candidates in which the time zones are assigned such that the time zones are continuous.

6. A method of maintaining a parallel processing apparatus comprising:
acquiring, by a computer, a first time and a second time;
generating a plurality of combinations each including a plurality of groups, each of the plurality of groups including a specific number of nodes which are included in a plurality of nodes and are different from the specific number of nodes of another group of the plurality of groups;
acquiring, for each of the plurality of combinations, a number of jobs which are to be executed by the nodes of the specific number of each of the groups as a maintenance operation for each of the plurality of nodes in a time period from the first time to the second time;
calculating, for each of the plurality of combinations, a sum of the number of jobs for each of the groups;
selecting a combination having a smallest sum of the number of the jobs;
generating a plurality of schedule candidates by assigning a different time zone, which is between the first time and the second time, to each of the groups of the selected combination;
evaluating the plurality of schedule candidates based on one or more process execution schedules of one or more nodes of the groups of the selected combination; and
outputting one schedule candidate of the plurality of schedule candidates based on a result of the evaluation.

7. The parallel processing apparatus according to claim 6, wherein the specific number is set based on an average number of nodes used in processes in the maintenance operation in the past.

8. The parallel processing apparatus according to claim 6, wherein the nodes of the specific number are successively coupled.

9. The parallel processing apparatus according to claim 6, wherein the processor changes the one or more process execution schedules of the one or more nodes based on at least one of the schedule candidates.

10. The parallel processing apparatus according to claim 6, wherein the processor generates the plurality of schedule candidates in which the time zones are assigned such that the time zones are continuous.

* * * * *